United States Patent
Hall et al.

(10) Patent No.: US 8,549,197 B2
(45) Date of Patent: Oct. 1, 2013

(54) METHOD AND SYSTEM FOR COMMUNICATING DISPLAYPORT INFORMATION

(75) Inventors: Aaron Thomas Joseph Hall, North Vancouver (CA); Edward Khin Wui Loo, Vancouver (CA)

(73) Assignee: Icron Technologies Corporation, Burnaby (CA)

( * ) Notice: Subject to any disclaimer, the term of this patent is extended or adjusted under 35 U.S.C. 154(b) by 600 days.

(21) Appl. No.: 12/750,427

(22) Filed: Mar. 30, 2010

(65) Prior Publication Data

US 2011/0243035 A1    Oct. 6, 2011

(51) Int. Cl.
*G06F 13/42*    (2006.01)

(52) U.S. Cl.
USPC ........................................................ 710/105

(58) Field of Classification Search
USPC ........................................................ 710/105
See application file for complete search history.

(56) References Cited

U.S. PATENT DOCUMENTS

| | | | |
|---|---|---|---|
| 6,058,263 A * | 5/2000 | Voth ................................ | 703/25 |
| 6,381,666 B1 | 4/2002 | Kejser et al. | |
| 6,715,022 B1 * | 3/2004 | Ahern ............................ | 710/314 |
| 7,149,833 B2 | 12/2006 | McLeod | |
| 7,493,431 B2 | 2/2009 | McLeod | |
| 7,694,027 B2 | 4/2010 | Montag | |
| 2002/0138682 A1 * | 9/2002 | Shatas et al. .................. | 710/306 |
| 2008/0018657 A1 | 1/2008 | Montag | |
| 2008/0084359 A1 | 4/2008 | Giannuzzi et al. | |
| 2008/0172501 A1 | 7/2008 | Goodart et al. | |
| 2008/0205519 A1 | 8/2008 | Goodart et al. | |
| 2008/0240152 A1 * | 10/2008 | Quinn et al. .................. | 370/466 |
| 2008/0279186 A1 * | 11/2008 | Winter et al. ................. | 370/392 |
| 2008/0284621 A1 | 11/2008 | Diab et al. | |
| 2008/0285576 A1 | 11/2008 | Teener et al. | |
| 2008/0297520 A1 | 12/2008 | Montag | |
| 2009/0003331 A1 | 1/2009 | Winter et al. | |
| 2009/0153574 A1 | 6/2009 | Chou et al. | |
| 2009/0158377 A1 | 6/2009 | Diab et al. | |
| 2009/0179883 A1 | 7/2009 | Goodart et al. | |
| 2009/0278763 A1 | 11/2009 | Zeng et al. | |
| 2009/0279473 A1 * | 11/2009 | Lu et al. ........................ | 370/315 |
| 2010/0080218 A1 | 4/2010 | Kwa et al. | |
| 2010/0082859 A1 | 4/2010 | Hendry et al. | |
| 2010/0185792 A1 * | 7/2010 | Yao et al. ....................... | 710/33 |
| 2012/0005394 A1 * | 1/2012 | Goodart et al. ............... | 710/313 |

OTHER PUBLICATIONS

VESA DisplayPort Standard, Version 1, Revision 1a, Jan. 11, 2008, pp. 1, 93-95 and 118.*

* cited by examiner

*Primary Examiner* — Nimesh G Patel
(74) *Attorney, Agent, or Firm* — Gerald A. Gowan; Gowan Intellectual Property

(57) ABSTRACT

A system and method for communicating DisplayPort information is provided. The system includes: a local unit comprising a local controller operable to produce a request packet in response to a DisplayPort request received by the local unit from a DisplayPort source unit and to transmit the request packet to a remote unit of the system via a first simplex channel of a dual simplex communications link; and the remote unit comprising a remote controller operable to produce a reply packet in response to a DisplayPort reply received by the remote unit from a DisplayPort sink unit and to transmit the reply packet to the local unit via a second simplex channel of the communications link. The system allows distances between the source and sink greater than otherwise possible under the DisplayPort specification, and can communicate DisplayPort and non-DisplayPort signals via a variety of types of communications links.

22 Claims, 8 Drawing Sheets

METHOD AND SYSTEM FOR COMMUNICATING DISPLAYPORT INFORMATION

BACKGROUND OF THE INVENTION

1. Field of Invention

This invention relates to electronic communication and, in particular, to a method and system for communicating DisplayPort™ information.

2. Description of Related Art

DisplayPort™ information is any information that is expressed in accordance with the specification of the DisplayPort standard. The DisplayPort standard provides specifications of connectors, cables and data communication protocols for use in delivering uncompressed digital packetized video streams from a computer host to a display and in bi-directionally communicating control data between the computer host and the display. However, the DisplayPort specification is limited to communicating such control information by a half-duplex protocol in which bi-directional control signals are communicated one way at a time along a single, common communication medium. Also, the permitted range between the computer host and the display is limited by the DisplayPort specification timeout requirement, such that the computer host will time-out if a response from the display is not received within 300 microseconds following the delivery of control data from the computer host to the display.

United States patent application publication No. 2008/0240152 attributed to Quinn et al. discloses a system and method for communicating data for display on a display device. Quinn et al. disclose that in operation, a host device transmits a first set of DisplayPort data to a converter. The first set includes uncompressed DisplayPort data and/or control data for controlling the display device (e.g. turning the display device "on" or "off" or adjusting the brightness, contrast, tint or color of the display device). The converter converts the first set into network packets, which are transmitted via a data network and then converted into a second set of DisplayPort data for routing to the display device. However, the disclosure of Quinn et al. is limited to communicating control data in the direction from the host device to the display device for controlling the display device, and fails to address the effect of the timeout requirement of the DisplayPort specification on the permitted range between the host device and the display device.

United States patent application publication No. 2008/0279186 attributed to Winter et al. discloses a system and method for the communication of uncompressed visual information through a network. Winter et al. disclose that a packet converter switch encapsulates uncompressed visual information received from an information handling system into network packets and then communicates the network packets through one network port to traverse a conventional network architecture to reach a network port of a second packet converter, where the uncompressed visual information is extracted for communication through a DisplayPort port to a display device. Winter et al. disclose that bi-directional DisplayPort functions are supported by reference to mapping information on a packet converter switch to correctly switch information sent from a sink to a source device. Winter et al. disclose that such bi-directional DisplayPort functions include the communication of EDID information from the display device to the information handling system. However, the disclosure of Winter et al. is limited to the support of DisplayPort functions, and fails to address the effect of the timeout requirement of the DisplayPort specification on the permitted range between the information handling system and the display device.

United States patent application publication No. 2009/0003331 attributed to Winter et al. (the '331 publication) discloses a system and method for adding a transport layer to uncompressed visual information packets, in which a DisplayPort source creates a unique identifier associated with a sink device and a packet stuffer associated with the DisplayPort source adds the unique identifier to each DisplayPort packet. The packets are sent to the targeted sink device by reference to the unique identifier, including sending packets to distal locations through networks. However, the disclosure of the '331 publication is limited to adding the unique identifier to each DisplayPort packet, and fails to address the effect of the timeout requirement of the DisplayPort specification on the permitted range between the DisplayPort source and the targeted sink device.

U.S. Pat. No. 6,381,666 attributed to Kejser et al. discloses a method and apparatus for transmitting a data stream between a host controller and a peripheral device over an extended distance. However, the disclosure of Kejser et al. fails to address the communication of DisplayPort information.

U.S. Pat. No. 7,149,833 attributed to McLeod discloses a method and apparatus for extending the range of standard USB (Universal Serial Bus) devices and, in particular, USB devices operating in accordance with Revision 2.0 of the USB Specification. However, the disclosure of McLeod fails to address the communication of DisplayPort information.

U.S. Pat. No. 7,493,431 attributed to McLeod (the '431 patent) discloses a method and apparatus for extending the range of the USB protocol by an expanded range host controller in combination with a remote extender located adjacent to a peripheral device. The expanded range host controller provides extended time values for responding to the USB protocols, while the remote extender provides for data transmissions with the peripheral device which comply with the USB protocols. However, the disclosure of the '431 patent fails to address the communication of DisplayPort information.

SUMMARY

The above shortcomings may be addressed by providing, in accordance with one aspect of the invention, a method of communicating DisplayPort information. The method involves: transmitting by a local unit to a remote unit via a first simplex channel of a dual simplex communications link a request packet produced by the local unit in response to a DisplayPort request received by the local unit from a DisplayPort source unit; and transmitting by the remote unit to the local unit via a second simplex channel of the dual simplex communications link a reply packet produced by the remote unit in response to a DisplayPort reply received by the remote unit from a DisplayPort sink unit.

The method may involve storing in a request queue of a memory of the local unit a stored request comprising at least one of the DisplayPort request and the request packet. The method may involve storing in a reply queue of the memory a stored reply comprising at least one of the DisplayPort reply and the reply packet. The method may involve upon receiving by the local unit a subsequent DisplayPort request matching the stored request, performing by the local unit an operation selected from the group consisting of: outputting to the DisplayPort source unit a representative DisplayPort reply produced by the local unit in response to the reply packet so as to represent the DisplayPort request; outputting to the DisplayPort source unit a synthetic defer command produced by the local unit; and preventing output to the DisplayPort source unit so as to create a timeout. Outputting to the DisplayPort source unit a representative DisplayPort reply produced by the local unit in response to the reply packet so as to represent the DisplayPort request may involve determining a request queue position within the request queue of the stored request. Outputting to the DisplayPort source unit a representative DisplayPort reply produced by the local unit in response to the reply packet so as to represent the DisplayPort request may involve determining a reply queue position within the reply queue of the stored reply. Outputting to the DisplayPort source unit a representative DisplayPort reply produced by the local unit in response to the reply packet so as to represent the DisplayPort request may involve outputting the representative DisplayPort reply if the request queue position matches the reply queue position. Outputting to the DisplayPort source unit a synthetic defer command produced by the local unit may involve determining a request queue position within the request queue of the stored request. Outputting to the DisplayPort source unit a synthetic defer command produced by the local unit may involve outputting the synthetic defer command if the request queue position does not match a reply queue position associated with the reply queue. Preventing output to the DisplayPort source unit so as to create a timeout may involve determining a request queue position within the request queue of the stored request. Preventing output to the DisplayPort source unit so as to create a timeout may involve determining a reply queue position within the reply queue of the stored reply. Preventing output to the DisplayPort source unit so as to create a timeout may involve preventing the output if the request queue position matches the reply queue position and the stored reply comprises a timeout command. The method may involve upon performing the operation when a request queue position of the stored request matches a reply queue position of the stored reply. The method may involve discarding the stored request. The method may involve discarding any previously stored request. The method may involve discarding the stored reply. The method may involve discarding any previously stored reply. Storing in a request queue of a memory of the local unit a stored request comprising at least one of the DisplayPort request and the request packet may involve storing the stored request in the request queue having a capacity size of one. The method of claim 1 may involve outputting by the remote unit to the DisplayPort sink unit a representative DisplayPort request produced by the remote unit in response to the request packet so as to be representative of the DisplayPort request. Outputting by the remote unit to the DisplayPort sink unit a representative DisplayPort request produced by the remote unit in response to the request packet so as to be representative of the DisplayPort request may involve storing in a remote queue of a remote memory of the remote unit a remotely stored request comprising at least one of the request packet and the representative DisplayPort request. Outputting by the remote unit to the DisplayPort sink unit a representative DisplayPort request produced by the remote unit in response to the request packet so as to be representative of the DisplayPort request may involve outputting the representative DisplayPort request in response to receiving by the remote unit from the DisplayPort sink unit a sink defer command. Transmitting by the remote unit to the local unit via a second simplex channel of the dual simplex communications link a reply packet produced by the remote unit in response to a DisplayPort reply received by the remote unit from a DisplayPort sink unit may involve transmitting the reply packet comprising a timeout command if no response from the DisplayPort sink unit is received by the remote unit within a time window following the outputting of the representative DisplayPort request. Transmitting by the remote unit to the local unit via a second simplex channel of the dual simplex communications link a reply packet produced by the remote unit in response to a DisplayPort reply received by the remote unit from a DisplayPort sink unit may involve discarding the remotely stored request. The method may involve outputting by the remote unit to the DisplayPort sink unit a further representative DisplayPort request associated with a next earliest remotely stored request. The method may involve transmitting by the local unit to the remote unit via the first simplex channel non-DisplayPort (non-DP) data produced by the local unit in response to non-DP information received by the local unit from a non-DP source device. The method may involve transmitting by the remote unit to the local unit via the second simplex channel non-DP data produced by the remote unit in response to non-DP information received by the remote unit from a non-DP destination device.

In accordance with another aspect of the invention, there is provided a system for communicating DisplayPort information. The system includes: a local unit comprising a local controller operable to produce a request packet in response to a DisplayPort request received by the local unit from a DisplayPort source unit and to transmit the request packet to a remote unit of the system via a first simplex channel of a dual simplex communications link; and the remote unit comprising a remote controller operable to produce a reply packet in response to a DisplayPort reply received by the remote unit from a DisplayPort sink unit and to transmit the reply packet to the local unit via a second simplex channel of the dual simplex communications link.

The local controller may be operable to operate a request queue of a memory of the local unit. The local controller may be operable to operate a reply queue of the memory. The remote controller may be operable to operate a remote queue of a remote memory of the remote unit. The local controller may be operable to select an output selected from the group consisting of a representative DisplayPort reply, a synthetic defer command and a timeout. The local controller may be operable to output from the local unit an output selected from the group consisting of a representative DisplayPort reply, a synthetic defer command and a timeout. The remote controller may be operable to output from the remote unit a representative DisplayPort request. The local controller may be operable to produce non-DP downstream data in response to non-DP source information received by the local unit from a non-DP source device. The local controller may be operable to transmit the non-DP downstream data to the remote unit via the first simplex channel. The remote controller may be operable to produce non-DP upstream data in response to non-DP destination information received by the remote unit from a non-DP destination device. The local controller may be operable to transmit the non-DP upstream data to the local unit via the second simplex channel.

In accordance with another aspect of the invention, there is provided a system for communicating DisplayPort information. The system includes: local means for producing a request packet in response to a DisplayPort request received by a local unit of the system from a DisplayPort source unit and transmitting the request packet to a remote unit of the system via a first simplex channel of a dual simplex communications link; and remote means for producing a reply packet in response to a DisplayPort reply received by the remote unit from a DisplayPort sink unit and transmitting the reply packet to the local unit via a second simplex channel of the dual simplex communications link.

The local means may include request queuing means for operating a request queue of a memory of the local unit. The local means may include reply queuing means for operating a reply queue of the memory. The remote means may include remote queuing means for operating a remote queue of a remote memory of the remote unit. The local means may include local outputting means for selecting an output selected from the group consisting of a representative DisplayPort reply, a synthetic defer command and a timeout. The local means may include local outputting means for outputting by the local unit an output selected from the group consisting of a representative DisplayPort reply, a synthetic defer command and a timeout. The remote means may include remote outputting means for outputting by the remote unit a representative DisplayPort request. The local means may include non-DP local transmitting means for producing non-DP downstream data in response to non-DP source information received by the local unit from a non-DP source device. The local means may include non-DP local transmitting means for transmitting the non-DP downstream data to the remote unit via the first simplex channel. The remote means may include non-DP remote transmitting means for producing non-DP upstream data in response to non-DP destination information received by the remote unit from a non-DP destination device. The remote means may include non-DP local transmitting means for transmitting the non-DP upstream data to the local unit via the second simplex channel.

In accordance with another aspect of the invention, there is provided a computer program product comprising computer-executable instructions embodied in a computer-readable medium for controlling one or more processors of a local unit connected to a remote unit via a dual simplex communications link, the dual simplex communications link having first and second simplex channels, to carry out any one or more of the following steps in any order: (a) receiving a DisplayPort request from a DisplayPort source unit; (b) producing a request packet in response to the DisplayPort request; (c) storing in a request queue of a memory of the local unit a stored request comprising at least one of the DisplayPort request and the request packet; (d) transmitting the request packet to the remote unit via the first simplex channel; (e) receiving a reply packet from the remote unit via the second simplex channel; (f) associating the reply packet with the stored request; (g) producing a DisplayPort reply in response to the reply packet and outputting to the DisplayPort source unit the DisplayPort reply upon receiving a subsequent DisplayPort request corresponding to the stored request; (h) receiving non-DP information from a non-DP source; (i) producing non-DP data in response to the non-DP information; and (j) transmitting the non-DP data to the remote unit via the first simplex channel.

The computer program product may include computer-executable instructions for carrying out any one or more of the following steps in any order: (k) receiving upstream data from the remote unit via the second simplex channel; (l) producing upstream information in response to the upstream data; and (m) outputting the upstream information to the non-DP source.

In accordance with another aspect of the invention, there is provided a computer program product comprising computer-executable instructions embodied in a computer-readable medium for controlling one or more processors of a remote unit connected to a local unit via a dual simplex communications link, the dual simplex communications link having first and second simplex channels, to carry out any one or more of the following steps in any order: (a) receiving a DisplayPort packet from the local unit via the first simplex channel; (b) producing a DisplayPort request in response to the DisplayPort packet; (c) outputting the DisplayPort request to a DisplayPort sink unit upon resolution of preceding DisplayPort requests; (d) subsequently outputting the DisplayPort request in response to receiving a sink defer command from the DisplayPort sink unit; (e) receiving a DisplayPort reply from the DisplayPort sink unit; (f) producing a reply packet in response to the DisplayPort reply; (g) transmitting the reply packet to the local unit via the second simplex channel; (h) receiving non-DP data from the local unit via the first simplex channel; (i) producing non-DP information in response to the non-DP data; and (j) outputting the non-DP information to a non-DP destination device.

The computer program product may include computer-executable instructions for carrying out any one or more of the following steps in any order: (k) receiving upstream information from the non-DP destination device; (l) producing upstream data in response to the upstream information; and (m) transmitting the upstream data to the local unit via the second simplex channel.

Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention.

DETAILED DESCRIPTION

A system for communicating DisplayPort information includes: local means for producing a request packet in response to a DisplayPort request received by a local unit of the system from a DisplayPort source unit and transmitting the request packet to a remote unit of the system via a first simplex channel of a dual simplex communications link; and remote means for producing a reply packet in response to a DisplayPort reply received by the remote unit from a DisplayPort sink unit and transmitting the reply packet to the local unit via a second simplex channel of the dual simplex communications link.

The local means may include request queuing means for operating a request queue of a memory of the local unit. The local means may include reply queuing means for operating a reply queue of the memory. The local means may include local outputting means for selecting and then outputting by the local unit an output selected from the group consisting of a representative DisplayPort reply, a synthetic defer command and a timeout. The local means may include non-DisplayPort (non-DP) local transmitting means for producing non-DP downstream data in response to non-DP source information received by the local unit from a non-DP source device and transmitting the non-DP downstream data to the remote unit via the first simplex channel.

The remote means may include remote queuing means for operating a remote queue of a remote memory of the remote unit. The remote means may include remote outputting means for outputting by the remote unit a representative DisplayPort request. The remote means may include non-DP remote transmitting means for producing non-DP upstream data in response to non-DP destination information received by the remote unit from a non-DP destination device and transmitting the non-DP upstream data to the local unit via the second simplex channel.

Figure 1:
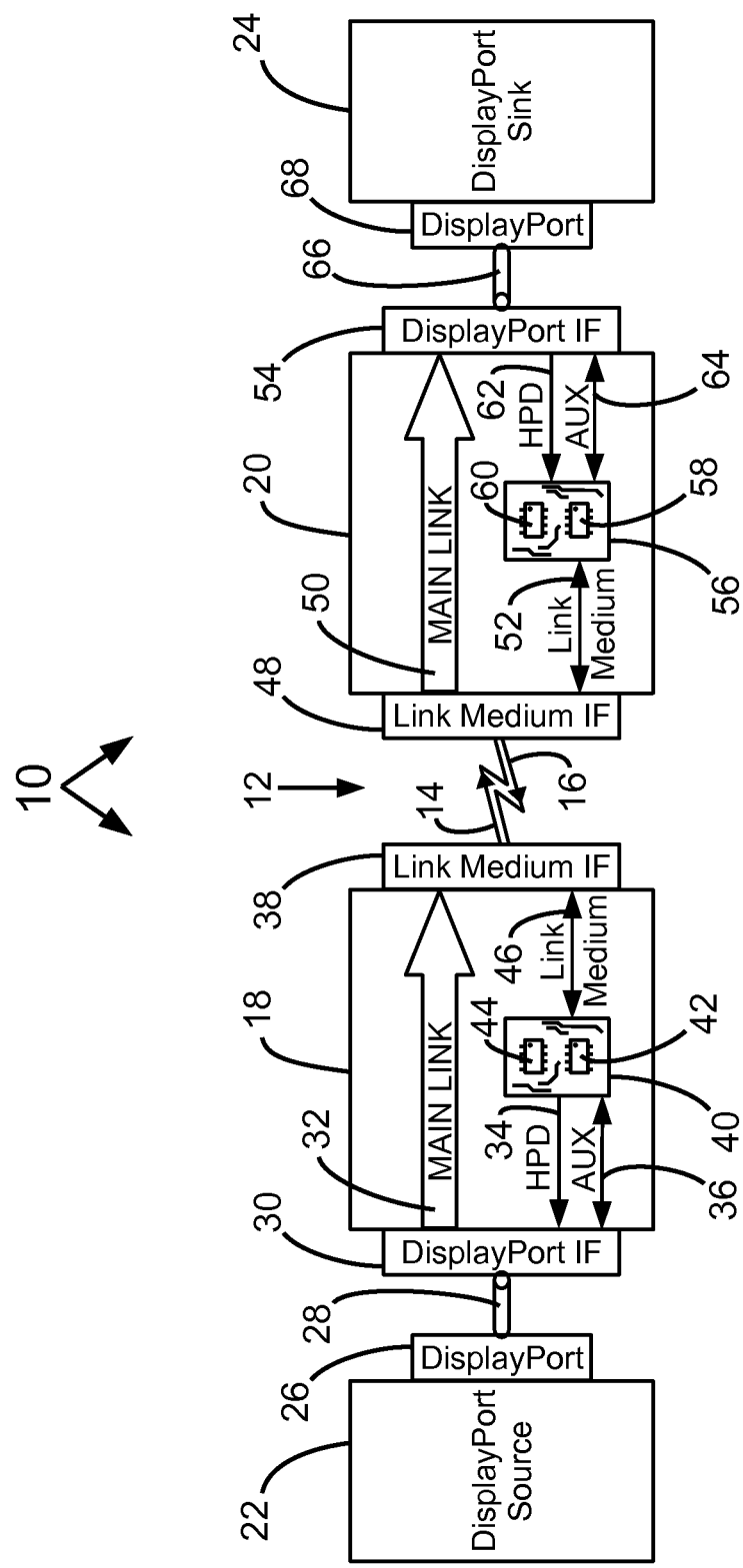
FIG. 1 is a block diagram of a system for communicating DisplayPort information according to a first embodiment of the invention.
Figure 12:
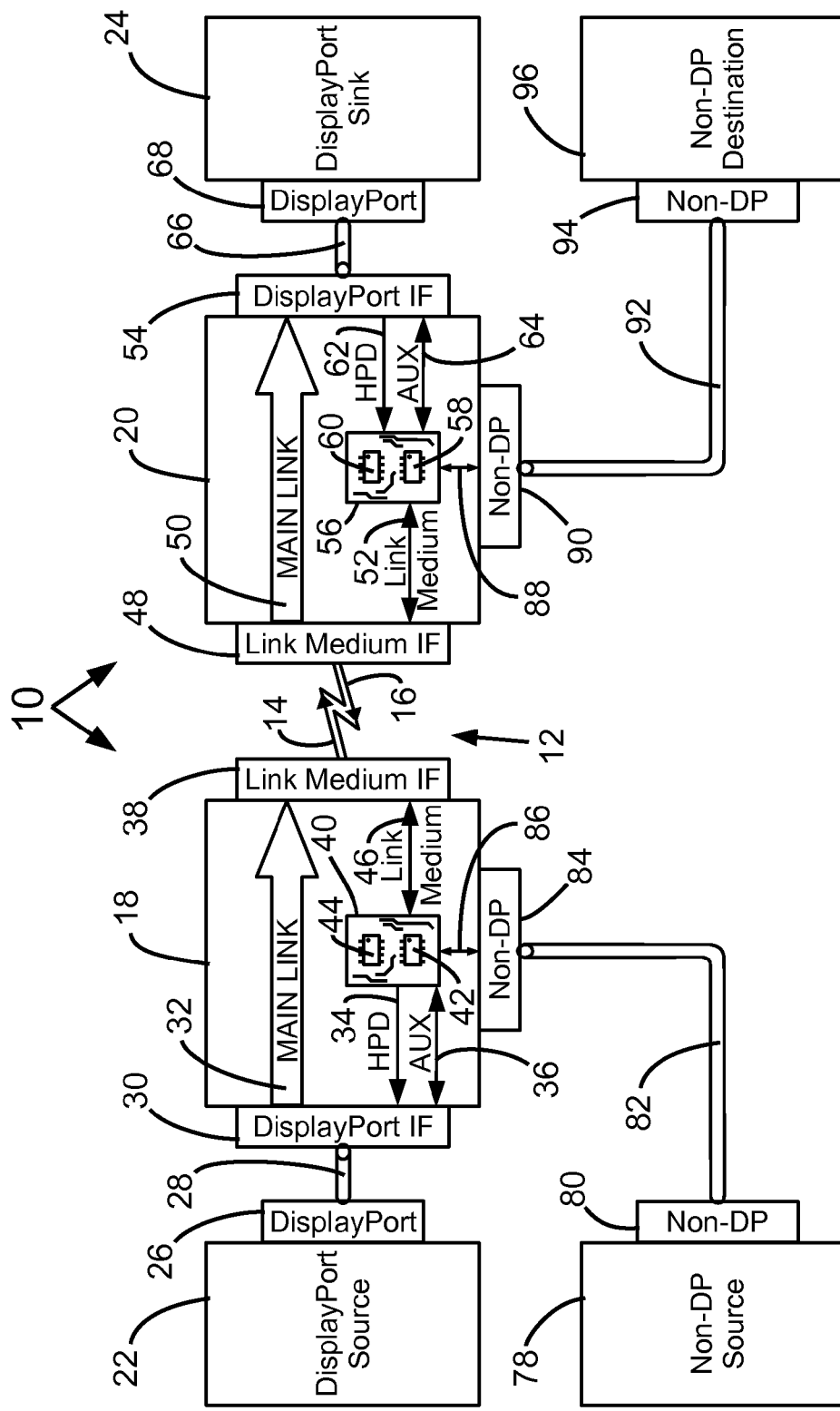
FIG. 12 is a block diagram of a system for communicating DisplayPort information according to variations and further embodiments of the invention, showing a non-DisplayPort source and a non-DisplayPort destination device.

Referring to FIG. 1, the system according to a first embodiment of the invention is shown generally at 10. The system 10 functions to communicate DisplayPort information along a communications link 12. The communications link 12 may be any wired or wireless connection suitable for transmitting data or other electronic signals, and may include a copper wire link, a coaxial cable link, a fiber-optic transmission link, a radio link, a cellular telephone link, a satellite link, a line-of-sight free optical link, and any combination thereof, for example. Preferably, the communications link 12 permits simultaneous two-way communications, such as by implementing a full-duplex or dual simplex medium. The communications link 12 is shown in FIG. 12 as implementing a dual simplex medium having one channel 14 intended for one-way communications in one direction and another channel 16 intended for one-way communications in the opposing direction.

The system 10 includes a local proxy unit 18 and a remote proxy unit 20 operable to effect communications between each other via the communications link 12. In the first embodiment, the local proxy unit 18 and the remote proxy unit 20 are not interchangeable. The system 10 advantageously permits the communication of DisplayPort information between a DisplayPort source 22 and a DisplayPort sink device 24 when the DisplayPort source 22 and the DisplayPort sink device 24 are physically separated by a distance not ordinarily within the range contemplated by the DisplayPort specification; advantageously permits the communication of DisplayPort information between the DisplayPort source 22 and the DisplayPort sink device 24 via one or more of a variety of different types of communications links 12; or advantageously permits the communication of DisplayPort information between the DisplayPort source 22 and the DisplayPort sink device 24 both over a distance not ordinarily within the range contemplated by the DisplayPort specification and via a variety of different types of communications links 12. For example, at least one revision of the DisplayPort specification limits the length of each DisplayPort cable to a length of 3 metres when such DisplayPort cable is used for communication in accordance with a High Bit Rate (HBR) mode.

In the typical configuration shown in FIG. 1, a DisplayPort source 22 can be any source of DisplayPort information. Typically, a DisplayPort source 22 is capable of producing visual information, and of producing and receiving related control information in accordance with the DisplayPort specification. Examples of DisplayPort sources 22 include any information processing system such as a general purpose digital computer; distributed network for computing; any visual information processor such as a graphics card connected to or embedded within an information processing system; an image rendering system such as an analog visual information unit coupled to a converter for producing DisplayPort information therefrom; television or related broadcast equipment; any telecommunications device; database controller; equipment controller; data processing equipment; discrete hardware components; any other functional device or equipment suitable for producing visual information signals; and any combination thereof, for example.

The DisplayPort sink device 24 shown in FIG. 1 can be any device capable of accepting DisplayPort information. Typically, a DisplayPort sink device 24 is capable of displaying visual information in accordance with the DisplayPort information being received by the DisplayPort sink device 24, and of receiving and producing control information in accordance with the DisplayPort specification. Examples of DisplayPort sink devices 24 include monitors, such as computer monitors; displays, such as embedded displays and stand-alone displays; and electronic signs of any size.

The DisplayPort source 22 shown in FIG. 1 has a source connector 26 for receiving the source DisplayPort cable 28. The source DisplayPort cable 28 is shown in FIG. 1 connected between the DisplayPort source 22 and a local DisplayPort interface 30 of the local proxy unit 18.

The local DisplayPort interface 30 in the first embodiment includes a physical connector, and information processing functionality for initial processing of signals received into the local DisplayPort interface 30 from the source DisplayPort cable 28 and for final processing of signals being delivered from the local DisplayPort interface 30 to the source DisplayPort cable 28. For example, the local DisplayPort interface 30 is shown in FIG. 1 as including information processing functionality for separately directing information signals between the source DisplayPort cable 28 and each of a local main link channel 32, a local HotPlug Detect (HPD) channel 34 and a local auxiliary (AUX) channel 36.

The local main link channel 32 in the first embodiment is operable to direct visual information signals in a downstream direction from the local DisplayPort interface 30 to a local link medium IF (interface) 38 of the local proxy unit 18. By way of example, when the local DisplayPort interface 30 receives DisplayPort information from the DisplayPort source 22 that includes an uncompressed digital packetized video stream according to the DisplayPort specification, the local DisplayPort interface 30 directs such video stream to the local main link channel 32 for delivery to the local link medium IF 38. Preferably, the video stream is delivered from the local DisplayPort interface 30 to the local link medium IF 38 with minimal or no detrimental effect in any attribute or quality of the uncompressed video stream.

The local HPD channel 34 in the first embodiment directs HPD information in the upstream direction from a local controller 40 to the local DisplayPort interface 30. Typically, HPD information indicates whether the DisplayPort sink device 24 is present or absent.

The local AUX channel 36 in the first embodiment bi-directionally directs auxiliary DisplayPort information between the local DisplayPort interface 30 and the local controller 40. Such auxiliary DisplayPort information may include control information relating to the control by the DisplayPort source 22 of the DisplayPort sink device 24. By way of example, the system 10 is advantageously operable to permit the DisplayPort source 22 to control the operation of the DisplayPort sink device 24 such as by issuing commands for the DisplayPort sink device 24 to power up or power down; issuing commands for the DisplayPort sink device 24 to enter or exit a sleep mode or an active mode; communicating to the DisplayPort sink device 24 parametric information such as parameter values for brightness, contrast, tint, color, etc.; receiving from the DisplayPort sink device 24 status information such as the current values of various parameters of the DisplayPort sink device 24; similar or related control communications or any combination thereof, for example. In accordance with the DisplayPort specification, auxiliary DisplayPort information may include EDID (Extended Display Identification Data) and/or MCCS (Monitor Control Command Set) data expressed in accordance with the I²C (Inter-Integrated Circuit) protocol, for example.

The local controller 40 functions to control features and implement methods of the system 10, including converting the format of data from that of the DisplayPort protocol to a protocol specific to a given communications link 12 and converting the format of further data from that of the communications link 12 specific protocol to the DisplayPort protocol.

As shown in FIG. 1, the local controller 40 includes a local processor 42 and a local memory 44.

The local processor 42 is typically a processing circuit that includes one or more circuit units, such as a central processing unit (CPU), digital signal processor (DSP), embedded processor, etc., and any combination thereof operating independently or in parallel, including possibly operating redundantly. The local processor 42 may be implemented by one or more integrated circuits (IC), including being implemented by a monolithic integrated circuit (MIC), an Application Specific Integrated Circuit (ASIC), a Field Programmable Gate Array (FPGA), programmable logic controller (PLC), etc. or any combination thereof. The local processor 42 may include circuitry for storing memory, such as digital data, and may comprise the local memory 44 or be in wired communication with the local memory 44, for example.

The local memory 44 in the first embodiment is operable to store digital representations of data or other information, including control information, and to store digital representations of program data or other information, including program code for directing operations of the local processor 42.

Typically, the local memory 44 is all or part of a digital electronic integrated circuit or formed from a plurality of digital electronic integrated circuits. The local memory 44 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. Additionally or alternatively, the local memory 44 may be implemented as Random Access Memory (RAM), variations of RAM such as static RAM (SRAM), Dynamic RAM (DRAM), variations of DRAM such as Synchronous DRAM (SDRAM) and Double Data Rate SDRAM (DDR SDRAM), Video RAM (VRAM), similar or related volatile memory technologies, or any combination thereof, for example. The local memory 44 may be operable to store digital representations as volatile memory, non-volatile memory, dynamic memory, etc. or any combination thereof.

The local controller 40 in the first embodiment is operable to implement a local queue, such as a First-In-First-Out (FIFO) queue, within the local memory 44 in accordance with the execution by the local processor 42 of computer-readable instructions.

Still referring to FIG. 1, the local proxy unit 18 includes a local link medium channel 46 connected between the local controller 40 and the local link medium IF 38. The local link medium channel 46 bi-directionally directs link medium information signals such as link medium data between the local controller 40 and the local link medium IF 38.

Both the local link medium channel 46 and the local main link channel 32 connect to the local link medium IF 38 of the local proxy unit 18. The local link medium IF 38 in the first embodiment includes a connector and/or wireless communications device (e.g. wireless transceiver). In the first embodiment, the local link medium IF 38 also includes information processing functionality for final processing of signals being delivered from the local link medium IF 38 to the communications link 12 and for initial processing of signals received into the local link medium IF 38 from the communications link 12. For example, the local link medium IF 38 is shown in FIG. 1 as including information processing functionality for separately directing information signals between the communications link 12 and each of the local main link channel 32 and the local link medium channel 46.

Although shown in FIG. 1 as functionally different channels, any one or more of the local main link channel 32, the local HPD channel 34, the local AUX channel 36 and the local link medium channel 46 may form part of a single physical bus within the local proxy unit 18.

As shown in FIG. 1, the remote proxy unit 20 includes a remote link medium IF 48 operable to act as an interface between the downstream end of the communications link 12 and the internal processing of the remote proxy unit 20.

The remote link medium IF 48 in the first embodiment includes a physical connector and/or wireless communications device (e.g. wireless transceiver). In the first embodiment, the remote link medium IF 48 also includes information processing functionality for initial processing of signals received into the remote link medium IF 48 from the communications link 12 and for final processing of signals being delivered from the remote link medium IF 48 to the communications link 12. For example, the remote link medium IF 48 is shown in FIG. 1 as including information processing functionality for separately directing information signals between the communications link 12 and each of a remote main link channel 50 and a remote link medium channel 52.

The remote main link channel 50 in the first embodiment is operable to direct visual information signals in a downstream direction from the remote link medium IF 48 to a remote DisplayPort interface 54 of the remote proxy unit 20. By way of example, when the remote proxy unit 20 receives the video stream from the local proxy unit 18 via the communications link 12, the remote link medium IF 48 directs the video stream to the remote main link channel 50 for delivery to the remote DisplayPort interface 54. Preferably, the video stream is delivered from the remote link medium IF 48 to the remote DisplayPort interface 54 with minimal or no detrimental effect in any attribute or quality of the video stream.

The remote link medium channel 52 bi-directionally directs link medium information signals such as link medium data between the remote link medium IF 48 and a remote controller 56.

As shown in FIG. 1, the remote controller 56 includes a remote processor 58 and a remote memory 60. The remote processor 58 may be implemented in a manner identical, similar or analogous to or different from that of the local processor 42, and the remote memory 60 may be implemented in a manner identical, similar or analogous to or different from that of the local memory 44. The remote controller 56 in the first embodiment is operable to implement a remote queue, such as a FIFO queue, within the remote memory 60 in a manner identical, similar or analogous to or different from that of the implementation of the local queue described herein above.

The remote controller 56 functions to control features and implement methods of the system 10, including converting the format of data between that of the DisplayPort protocol and that of a protocol specific to a given communications link 12. Preferably, the local controller 40 and the remote controller 56 operate compatibly such that the local controller 40 converts downstream DisplayPort information received by the local proxy unit 18 from the DisplayPort source 22 to a communications format selected for transporting via the given communications link 12 in use, and the remote controller 56 converts the transported information, upon being received by the remote proxy unit 20 via the communications link 12, to DisplayPort information representative of that communicated from the DisplayPort source 22. Similarly, upstream DisplayPort information received by the remote proxy unit 20 from the DisplayPort sink device 24 is converted by the remote controller 56 to the selected communications format for transporting upstream via the communications link 12, and the local controller 40 converts the upstream transported information, upon being received by the local proxy unit 18, to DisplayPort information representative of that communicated from the DisplayPort sink device 24.

The local proxy unit 18 and the remote proxy unit 20 may be implemented in various embodiments for compatibility with different specific communications link medium and protocol. For example, the local proxy unit 18 and the remote proxy unit 20 may be implemented in the first embodiment for compatibility with a first communications link 12 type; while the local proxy unit 18 and the remote proxy unit 20 in accordance with a second embodiment of the invention may be implemented for compatibility with a second, different communications link 12 type. In some embodiments, the local proxy unit 18 and the remote proxy unit 20 are compatible with a plurality of different communications link 12 types, including being selectably compatible therewith. In variations of embodiments, selecting the operation of the local proxy unit 18 and the remote proxy unit 20 for compatibility with a desired communications link 12 type may involve actuating a hardware switch (e.g. setting DIP switches); actuating a firmware switch (e.g. firmware upgrade); actuating a software switch (e.g. auto-detect and/or selection by user interface); selecting one of a plurality of connectors available on the local proxy unit 18 and the remote proxy unit 20 when physically connecting the local proxy unit 18 and the remote proxy unit 20 to the communications link 12; similar selection operations; and any combination thereof, for example.

In some embodiments, at least some DisplayPort information is transported via the communications link 12 in accordance with the DisplayPort specification. For example, in accordance with the first embodiment shown in FIG. 1, the video stream delivered along the local main link channel 32 and the remote main link channel 50 bypasses the local controller 40 and the remote controller 56, respectively, and is delivered along the communications link 12 in accordance with a format and protocol in compliance with the DisplayPort specification.

As shown in FIG. 1, the remote controller 56 connects to a remote HotPlug Detect (HPD) channel 62 and a remote auxiliary (AUX) channel 64.

The remote HPD channel 62 in the first embodiment directs HPD information, such as an indication of a connection event, in the upstream direction from the remote DisplayPort interface 54 to the remote controller 56.

The remote AUX channel 64 in the first embodiment bi-directionally directs auxiliary DisplayPort information (e.g. EDID over $I^2C$) between the remote controller 56 and the remote DisplayPort interface 54.

Although shown in FIG. 1 as functionally different channels, any one or more of the remote main link channel 50, the remote HPD channel 62, the remote AUX channel 64 and the remote link medium channel 52 may form part of a single physical bus within the remote proxy unit 20.

The remote proxy unit 20 is shown in FIG. 1 as connected by a sink DisplayPort cable 66 to a sink connector 68 of the DisplayPort sink device 24.

The remote DisplayPort interface 54 in the first embodiment includes a physical connector, and information processing functionality for final processing of signals being delivered from the remote DisplayPort interface 54 to the sink DisplayPort cable 66 and for initial processing of signals received into the remote DisplayPort interface 54 from the sink DisplayPort cable 66. For example, the remote DisplayPort interface 54 is shown in FIG. 1 as including information processing functionality for separately directing information signals between the sink DisplayPort cable 66 and each of the remote main link channel 50, the remote HPD channel 62 and the remote AUX channel 64.

Method of Operation

Referring to FIGS. 1 to 9, the local memory 44 of the first embodiment contains local blocks of code comprising computer executable instructions for directing the local processor 42 to perform the steps of local methods of the local proxy unit 18. Similarly, the remote memory 60 contains remote blocks of code comprising computer executable instructions for directing the remote processor 58 to perform the steps of remote methods of the remote proxy unit 20. In general, the local blocks of code and the remote blocks of code are different, although some portions thereof may be identical, similar or analogous to each other. Such blocks of code may form part of a computer program product comprising computer executable instructions embodied in a signal bearing medium, which may be a recordable computer readable medium or a signal transmission type medium, for example.

The methods of the system 10 are illustrated by way of the exemplary sequence diagrams shown in FIGS. 2 to 9, in which the passage of time is represented in the downward direction from top to bottom of such sequence diagrams, and the electronic communications between devices is represented by arrows in the horizontal or near horizontal direction from side to side of such sequence diagrams. In the sequence diagrams of FIGS. 2 to 9, electronic communications or signals present at the DisplayPort source 22 (FIG. 1) are indicated at various points along the vertical time axis 70 positioned directly beneath the "SRC" header. Similarly, electronic communications or signals present at the local proxy unit 18 (FIG. 1) are indicated at various points along the vertical time axis 72 positioned directly beneath the "LPU" header. Continuing similarly, the vertical time axis 74 associated with the remote proxy unit 20 (FIG. 1) is positioned directly beneath the "RPU" header, and the time 76 axis associated with the DisplayPort sink device 24 (FIG. 1) is positioned directly beneath the "SNK" header. The graphical distances between the various time axes represent communications cables or links between the various associated devices. Dashed lines extending horizontally between the time axis 70 and the time axis 72 indicate boundaries between time slots relating to the local proxy unit 18, and dashed lines extending horizontally between the time axis 74 and the time axis 76 indicate boundaries between time slots relating to the remote proxy unit 20. Vertically adjacent time slots shown in FIGS. 2 to 9 are typically, but not necessarily, immediately adjacent in time.

The sequence diagrams of FIGS. 2 to 9 illustrate the communication of control information such as HPD signals and AUX channel data. For ease of explanation, none of the sequence diagrams of FIGS. 2 to 9 illustrate DisplayPort information representing a video stream being delivered from the DisplayPort source 22 to the DisplayPort sink device 24. However, it is understood that such video streams can be delivered in accordance with embodiments of the present invention concurrently with the illustrated communication of control information.

When electrical power is being supplied to the local processor 42, the local memory 44, the remote processor 58 and the remote memory 60, the local processor 42 is directed to execute method steps causing the local proxy unit 18 to behave as indicated by the exemplary sequence diagrams and the remote processor 58 is directed to execute method steps causing the remote proxy unit 20 to behave as indicated by the exemplary sequence diagrams.

Figure 2:
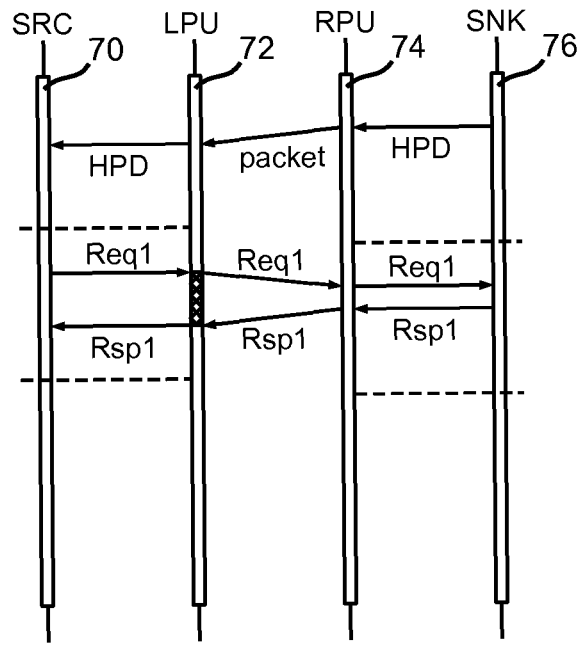
FIG. 2 is a sequence diagram of an exemplary sequence of a method of operation of the system shown in FIG. 1, showing the transmission of DisplayPort HotPlug Detect, request and response signals.

As shown in FIG. 2 with reference to FIG. 1, the DisplayPort sink device 24 at an exemplary (and arbitrary) starting point in time produces a HotPlug Detect (HPD) signal in accordance with the DisplayPort specification. As indicated by the uppermost and rightmost arrow of FIG. 2, the HPD signal is delivered to the remote proxy unit 20. The remote proxy unit 20 in the first embodiment is operable to receive the HPD signal and to produce in response to the received HPD signal a HPD packet (or multiple packets) associated with the HPD signal. In the first embodiment, the HPD packet is produced in accordance with a format and protocol that is compatible with the given communications link 12 connected to or forming part of the system 10. Typically, the format and protocol of the given communications link 12 requires the production of data packets, although in general any communications format and/or protocol is within the scope contemplated by the present invention. In the first embodiment, the remote proxy unit 20 is operable to transmit the HPD packet via the communications link 12 to the local proxy unit 18, which in turn is operable to receive the HPD packet. The local proxy unit 18 is further operable to produce in response to the received HPD packet a HPD signal in accordance with the DisplayPort specification that is representative of, including possibly being identical to, the HPD signal previously received by the remote proxy unit 20. The local proxy unit 18 transmits as DisplayPort compliant output the representative HPD signal to the DisplayPort source 22 as indicated by the upper leftmost arrow of the sequence diagram of FIG. 2.

When the DisplayPort source 22 has determined that the DisplayPort sink device 24 is available for receiving DisplayPort information such as DisplayPort requests, the DisplayPort source 22 can produce a first request "Req1" in accordance with the DisplayPort specification. As indicated by the upper leftmost arrow of the second time slot of FIG. 2, the Req1 DisplayPort request is delivered to the local proxy unit 18. The local proxy unit 18 in the first embodiment is operable to receive the Req1 DisplayPort request and to produce in response to the Req1 DisplayPort request a request packet (or multiple request packets) corresponding to the Req1 DisplayPort request for delivery to the remote proxy unit 20 via the communications link 12. In the first embodiment, this Req1 packet is also produced in accordance with the format and protocol that is compatible with the given communications link 12. The produced Req1 packet is delivered to the remote proxy unit 20 via the communications link 12, and received by the remote proxy unit 20.

Upon receiving the Req1 packet, the remote proxy unit 20 is operable in the first embodiment to produce in response to the received Req1 packet a DisplayPort request that is representative of, including possibly having identical data content as, the Req1 DisplayPort request previously received by the local proxy unit 18. The remote proxy unit 20 transmits as DisplayPort compliant output the representative Req1 DisplayPort request to the DisplayPort sink device 24.

When the DisplayPort sink device 24 receives the representative Req1 DisplayPort request, the DisplayPort sink device 24 can transmit a first response Rsp1 to the remote proxy unit 20 in accordance with the DisplayPort specification.

Upon receiving the Rsp1 DisplayPort response from the DisplayPort sink device 24, the remote proxy unit 20 is operable to produce in response to the received Rsp1 DisplayPort response a response packet (or multiple response packets) corresponding to the Rsp1 DisplayPort response for delivery to the local proxy unit 18 via the communications link 12, using the appropriate format and protocol for the communications link 12. The produced Rsp1 packet is delivered to the local proxy unit 18 via the communications link 12, and received by the local proxy unit 18.

Upon receiving the Rsp1 packet, the local proxy unit 18 is operable in the first embodiment to produce in response to the received Rsp1 packet a representative DisplayPort response representative of the Rsp1 DisplayPort response. The local proxy unit 18 outputs the representative Rsp1 DisplayPort response to the DisplayPort source 22.

As shown in the exemplary illustration of FIG. 2, the representative Rsp1 DisplayPort response is received by the DisplayPort source 22 within the same time slot after having issued the Req1 DisplayPort request.

Figure 3:
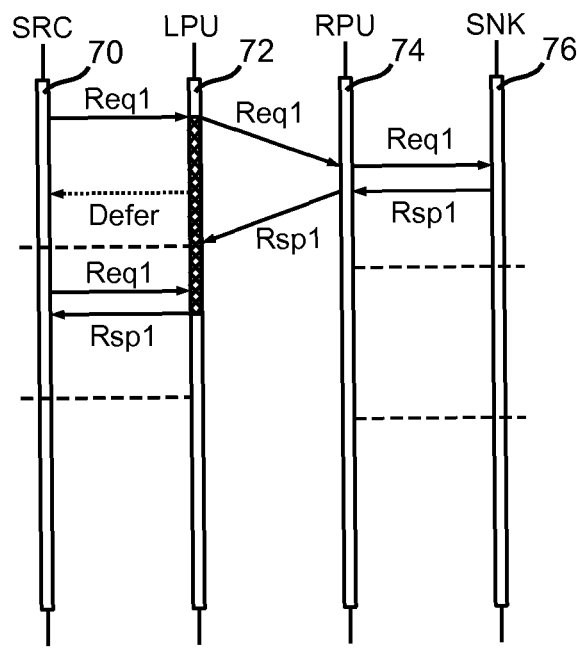
FIG. 3 is a sequence diagram of an exemplary sequence of a method of operation of the system shown in FIG. 1, showing a synthetic defer command.

Referring to FIG. 3, a first DisplayPort request "Req1" received by the local proxy unit 18 from the DisplayPort source 22 is delivered to the DisplayPort sink device 24 in the manner described above with reference to FIG. 2. However, in the exemplary sequence illustrated in FIG. 3, no Rsp1 packet is received by the local proxy unit 18 within the time period after receiving the Req1 DisplayPort request permitted by the DisplayPort specification. Accordingly, the local proxy unit 18 outputs to the DisplayPort source 22 a synthetic defer command in accordance with the DisplayPort specification. Such synthetic defer command effectively communicates to the DisplayPort source 22 that more time is requested to provide a response to the Req1 DisplayPort request, thereby advantageously permitting the system 10 to provide an extended distance between the DisplayPort source 22 and the DisplayPort sink device 24 without resulting in timeout errors and accompanying loss of DisplayPort control information.

The DisplayPort specification response time period is 300 microseconds, in accordance with at least one published revision of the DisplayPort specification. In accordance with the first embodiment, the local proxy unit 18 is operable to output its synthetic defer command within the same time slot in which the local proxy unit 18 received the Req1 DisplayPort request to which no Rsp1 packet was received. In the first embodiment, the local proxy unit 18 is operable to output its synthetic defer command within 200 to 500 microseconds after receiving the Req1 DisplayPort request, and preferably within a response time period of 300 to 400 microseconds after receiving the Req1 DisplayPort request.

When the local proxy unit 18 does receive the Rsp1 packet, the local proxy unit 18 is operable to produce in response to the Rsp1 packet a representative Rsp1 DisplayPort response corresponding to the Rsp1 DisplayPort response received by the remote proxy unit 20. In accordance with the DisplayPort protocol, the local proxy unit 18 outputs the representative Rsp1 DisplayPort response within a specified time after receiving a Req1 DisplayPort request, thereby advantageously preventing the DisplayPort source 22 from sensing a timeout error when a suitable response is available.

To output the Rsp1 DisplayPort response within such specified time, the local proxy unit 18 is operable to associate responses with corresponding requests. To do so, the local proxy unit 18 is operable to store and maintain copies of requests and responses during particular time periods, which are indicated in FIGS. 2 to 9 by hatched, lined and zigzag markings along sections of the time axis 70.

Referring again to FIG. 3, the local proxy unit 18 is operable to store in the local memory 44 a copy of the Req1 DisplayPort request when it is first received from the DisplayPort source 22, a copy of the Req1 packet produced in response to the Req1 DisplayPort request, or both the Req1 DisplayPort request and the Req1 packet. In the first embodiment, the local proxy unit 18 stores the Req1 DisplayPort request and/or Req1 packet by storing a portion of contents relating to both the Req1 DisplayPort request and the Req1 packet. Such contents may be or include decoded contents, for example. Preferably, the local proxy unit 18 stores at least sufficient data to identify the Req1 DisplayPort request should the same request be subsequently be received by the local proxy unit 18. In some embodiments, the local proxy unit 18 stores one or more data frames embodying decoded contents of a DisplayPort request. Additionally or alternatively, the local proxy unit 18 may store identifying information identifying a given DisplayPort request. Preferably, the local proxy unit 18 stores the copy in a local proxy unit 18 request queue of the local memory 44, which may be a FIFO queue for example.

When the local proxy unit 18 receives from the DisplayPort source 22 the subsequently transmitted Req1 DisplayPort request, the local proxy unit 18 is operable to compare the subsequent Req1 DisplayPort request with the stored copy, thereby determining that the subsequently received request is the same as that previously received and is not a new and different request.

When the local unit receives from the remote proxy unit 20 the Rsp1 packet, the local proxy unit 18 is operable to store in the local memory 44 a copy the Rsp1 packet, a copy of the representative Rsp1 DisplayPort response produced in response to the Rsp1 packet, or both the Rsp1 packet and the representative Rsp1 DisplayPort response. The local proxy unit 18 is operable to store the representative Rsp1 DisplayPort response and/or Rsp1 packet by storing any related contents thereof sufficient to permit the local proxy unit 18 to subsequently output the representative Rsp1 DisplayPort response. Such related contents may be or include one or more portions of the representative Rsp1 DisplayPort response and/or Rsp1 packet, decoded contents thereof, identifying data, or any combination thereof, for example. Preferably, the local proxy unit 18 stores the copy in a local proxy unit 18 response queue of the local memory 44, which may be a FIFO queue for example.

When the local proxy unit 18 receives the subsequent Req1 DisplayPort request, such as during a subsequent time slot, the local proxy unit 18 is operable to compare the received subsequent Req1 DisplayPort request with the stored copy to determine equivalence therebetween. The local proxy unit 18 is then operable to retrieve from the response queue the stored response copy so as to output the representative Rsp1 DisplayPort response to the DisplayPort source 22.

Upon outputting a response corresponding to a given request from the DisplayPort source 22, the local proxy unit 18 no longer requires the stored copies associated with the given request and may safely discard such copies, as indicated by the lower end of the hatched marking section of the time axis 70 of FIG. 2.

Figure 4:
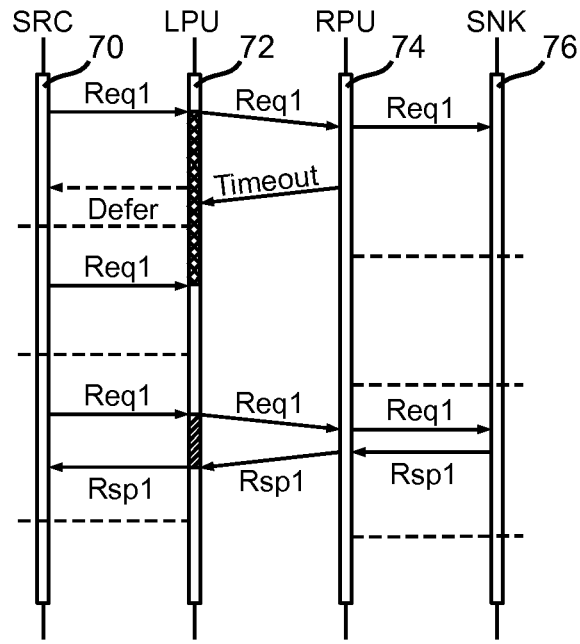
FIG. 4 is a sequence diagram of an exemplary sequence of a method of operation of the system shown in FIG. 1, showing the transmission of a timeout packet.

Referring to FIG. 4, a Req1 DisplayPort request issued by the DisplayPort source 22 is transmitted by the system 10 to the DisplayPort sink device 24 in a manner described herein above with reference to FIGS. 2 and 3. In the exemplary sequence of FIG. 4, the DisplayPort sink device 24 fails to provide a response to this request within a time period required by the DisplayPort specification. In response to not receiving a response in sufficient time after outputting its representative Req1 DisplayPort request, the remote proxy unit 20 transmits a timeout packet to the local proxy unit 18. In the first embodiment, the timeout packet is a Rsp1 packet having data contents representative of a timeout command.

Upon receiving the timeout packet, the local proxy unit 18 associates this timeout packet with the Req1 DisplayPort request. Thereafter, upon the next receipt from the DisplayPort source 22 of a subsequent Req1 DisplayPort request (i.e. a DisplayPort request corresponding to the stored request of the local request queue), the local proxy unit 18 is operable to inhibit output from the local proxy unit 18 to the DisplayPort source 22, thereby causing a timeout error within the DisplayPort source 22 corresponding to the timeout condition of the DisplayPort sink device 24. In the first embodiment, the local proxy unit 18 is operable to inhibit output for a time period in accordance with the DisplayPort specification, such as a time period of 300 microseconds.

Upon completion of the timeout sequence, a subsequent request from the DisplayPort source 22 in a later time slot, shown in FIG. 4 as a repeat of the Req1 DisplayPort request, is treated in the first embodiment by the local proxy unit 18 in the manner of resumed normal operation. Thus, as shown in FIG. 4 the subsequent Req1 DisplayPort request received by the system 10 is forwarded to the DisplayPort sink device 24 and any response received therefrom is forwarded through the system 10 to the DisplayPort source 22.

Figure 5:
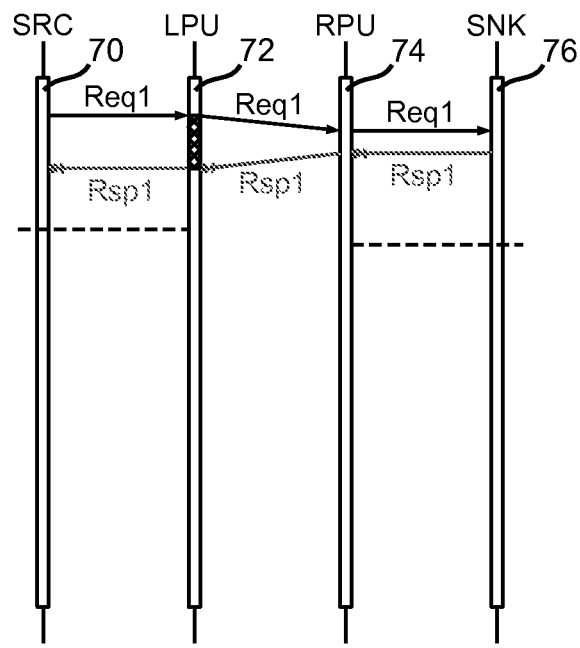
FIG. 5 is a sequence diagram of an exemplary sequence of a method of operation of the system shown in FIG. 1, showing the transmission of a corrupted response.

Referring to FIG. 5, a Req1 DisplayPort request received by the system 10 from the DisplayPort source 22 is forwarded to the DisplayPort sink device 24 as described herein above. In the exemplary sequence of FIG. 5, the DisplayPort sink device 24 produces in response to the representative Req1 DisplayPort request an invalid or otherwise corrupted response, indicated in FIG. 5 by the circle-and-bar tipped arrow extending from the DisplayPort sink device 24 to the remote proxy unit 20. A corrupted response may include a bit error, encoding error, timing error, similar error or any combination thereof, for example. Such corrupting errors may be caused by random electromagnetic noise, poor signal integrity, implementation errors within the DisplayPort sink device 24, similar causes, or any combination thereof for example.

Upon receiving a corrupted Rsp1 packet in the exemplary sequence of FIG. 5, the local proxy unit 18 produces from the Rsp1 packet a representative Rsp1 DisplayPort response. As shown in FIG. 5, the local proxy unit 18 is operable to faithfully reproduce the corruption such that the representative Rsp1 DisplayPort response outputted by the local proxy unit 18 constitutes a corrupted response.

Figure 6:
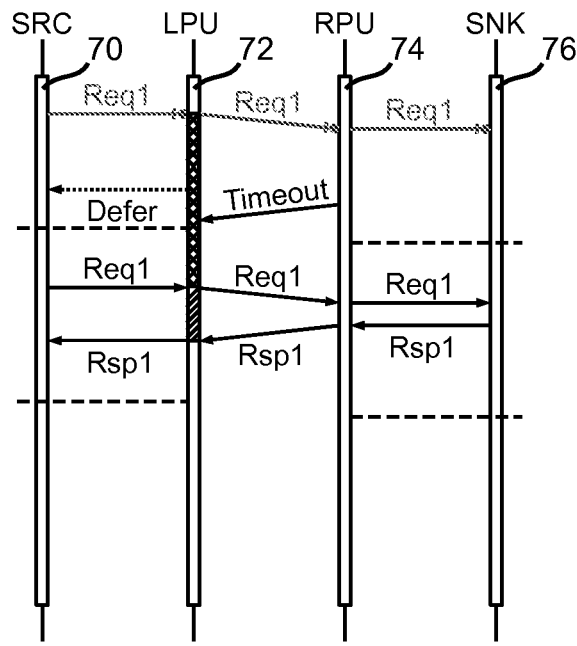
FIG. 6 is a sequence diagram of an exemplary sequence of a method of operation of the system shown in FIG. 1, showing the transmission of a corrupted request.

In the exemplary sequence of FIG. 6, the DisplayPort source 22 transmits to the local proxy unit 18 an invalid or otherwise corrupted request, as indicated in FIG. 6 by the circle-and-bar tipped arrow extending from the DisplayPort source 22 to the local proxy unit 18. As shown in FIG. 6, the system 10 in the first embodiment is operable to faithfully reproduce the corruption such that the representative Req1 DisplayPort request outputted to the DisplayPort sink device 24 is also corrupted. In the exemplary sequence of FIG. 6, the DisplayPort sink device 24 fails to provide to the remote proxy unit 20 a response to the corrupted request within the allotted time permitted by the DisplayPort specification, therefore the remote proxy unit 20 transmits a timeout packet to the local proxy unit 18. In the exemplary sequence of FIG. 6, the DisplayPort source 22 does not provide to the local proxy unit 18 a subsequent Req1 DisplayPort request having equivalence with the corrupted Req1 DisplayPort request, therefore the local proxy unit 18 is operable to treat the subsequent corrected Req1 DisplayPort request as a new request. Such new request is delivered to the DisplayPort sink device 24 by the system 10 as described herein above with reference to FIG. 2, for example.

In some embodiments, the system 10 is operable to decode each new DisplayPort request and/or DisplayPort response received by the system and determine whether certain errors have occurred, thereby advantageously detecting corrupted DisplayPort requests and DisplayPort responses. In such embodiments, the system 10 is operable to ignore detected corrupted requests and/or responses, take corrective action in response to detected corrupted requests and/or responses, or any combination thereof for example.

Figure 7:
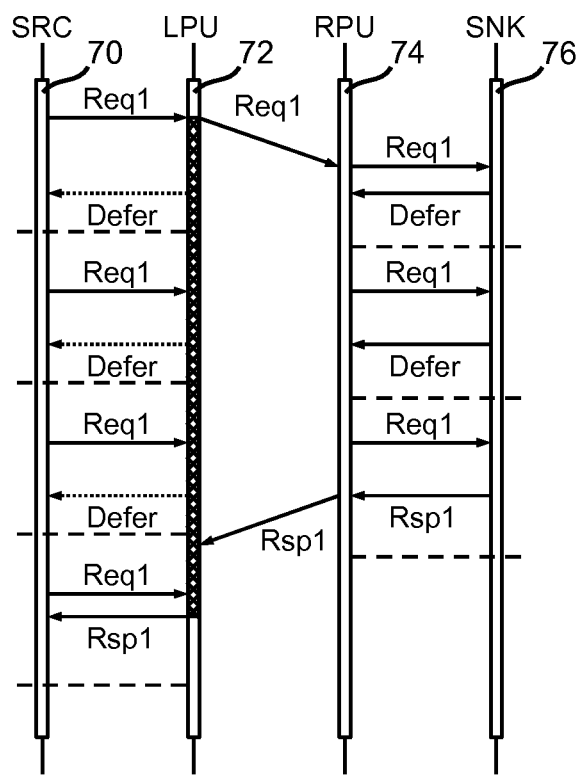
FIG. 7 is a sequence diagram of an exemplary sequence of a method of operation of the system shown in FIG. 1, showing the receiving and outputting of multiple defer commands.

Referring to FIG. 7, a Req1 DisplayPort request received by the system 10 from the DisplayPort source 22 is forwarded to the DisplayPort sink device 24 as described herein above. In the exemplary sequence of FIG. 7, the DisplayPort sink device 24 produces a defer command in response to the representative Req1 DisplayPort request. In response to receiving the defer command, the remote proxy unit 20 is operable to inhibit the transmission of a communication via the communications link 12 from the remote proxy unit 20 to the local proxy unit 18 for at least a specified time period based on the DisplayPort specification. As the local proxy unit 18 fails to receive a response packet within the response time period based on the DisplayPort specification, the local proxy unit 18 outputs a synthetic defer command to the DisplayPort source 22 in a manner described herein above.

During the immediately subsequent time slot, the remote proxy unit 20 outputs to the DisplayPort sink device 24 a subsequent representative Req1 DisplayPort request. To do so, the remote proxy unit 20 of the first embodiment is operable to store in the remote memory 60 a copy of the Req1 packet received from the local proxy unit 18, a copy of the representative Req1 DisplayPort request produced by the remote proxy unit 20, or both the Req1 packet and the representative Req1 DisplayPort request. In the first embodiment, the remote proxy unit 20 is operable to store the Req1 packet and/or the representative Req1 DisplayPort request by storing any related contents thereof sufficient to permit the remote proxy unit 20 to subsequently output the representative Req1 DisplayPort request. Such related contents may be or include one or more portions of the Req1 packet and/or the representative Req1 DisplayPort request, decoded contents thereof, identifying data, or any combination thereof, for example. Preferably, the remote proxy unit 20 stores the copy in a remote proxy unit 20 request queue of the remote memory 60, which may be a FIFO queue for example.

In the first embodiment of FIG. 7, the remote proxy unit 20 is operable to wait a minimum time in accordance with the DisplayPort specification, such as a minimum time of 10 nanoseconds, after receiving a defer command from the DisplayPort sink device 24 before outputting a subsequent attempt of the Req1 DisplayPort request.

As shown in FIG. 7, the system 10 is operable to numerously extend the time for providing a response, within the limits permitted by the DisplayPort specification. For example, in accordance with at least one published revision of the DisplayPort specification, a DisplayPort source 22 will retry a given request up to seven (7) times before ceasing further attempts.

In the exemplary sequence of FIG. 7, the DisplayPort sink device 24 provides a Rsp1 DisplayPort response following the third time the remote proxy unit 20 outputs a representative Req1 DisplayPort request to the DisplayPort sink device 24. Upon receiving the Rsp1 DisplayPort response, the remote proxy unit 20 produces and transmits to the local proxy unit 18 a Rsp1 packet. Thereafter, the remote response copy may be safely discarded from the remote memory 60. Upon receiving the Rsp1 packet, the local proxy unit 18 outputs a representative Rsp1 DisplayPort response within the specified time period following the next issuance by the DisplayPort source 22 of the Req1 DisplayPort request. Thereafter, the local request and response copies may be safely discarded from the local memory 44.

Figure 8:
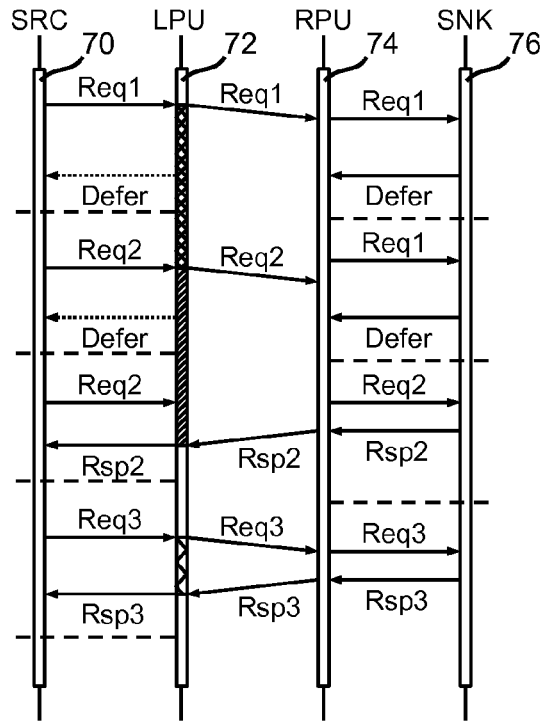
FIG. 8 is a sequence diagram of an exemplary sequence of a method of operation of the system shown in FIG. 1, showing multiple requests.

Referring to FIG. 8, a Req1 DisplayPort request received by the system 10 from the DisplayPort source 22 is forwarded to the DisplayPort sink device 24 as described herein above. In the exemplary sequence of FIG. 8, the DisplayPort sink device 24 produces a defer command in response to the representative Req1 DisplayPort request, with the result described herein above that the local proxy unit 18 outputs a synthetic defer command to the DisplayPort source 22. In the exemplary sequence of FIG. 8, a subsequent DisplayPort request received by the local proxy unit 18 from the DisplayPort source 22 does not correspond to the Req1 DisplayPort request, and therefore is treated by the system 10 as a new request. This new request is indicated in FIG. 8 as the "Req2" DisplayPort request.

In the first embodiment, the local proxy unit 18 is operable to receive the Req2 DisplayPort request, produce a Req2 packet in response to the Req2 DisplayPort request, and store a local request copy of the Req2 DisplayPort request and/or produce a Req2 packet. Moreover, the local proxy unit 18 in the first embodiment is operable to discard the local request copy associated with the previously received Req1 DisplayPort request. Preferably, the local request queue in accordance with the first embodiment has the capacity to store one and only one local request copy such that storing the Req2 local request copy overwrites the Req1 local request copy, thereby discarding such Req1 local request copy. The change from storing the Req1 local request copy to storing the Req2 local request copy is indicated in FIG. 8 along the time axis 72 as a change from hatch markings to diagonal markings.

Having produced the Req2 packet, the local proxy unit 18 is operable to transmit the Req2 packet to the remote unit 18 via the communications link 12.

Upon receiving the Req2 packet, the remote proxy unit 20 is operable to produce a representative Req2 DisplayPort request in a manner analogous to that described herein above in respect of producing the representative Req1 DisplayPort request. The remote proxy unit 20 in the first embodiment is also operable to store a remote request copy of the Req2 packet and/or representative Req2 DisplayPort request in a manner analogous to that described herein above in respect of storing a remote request copy associated with the Req1 packet. Moreover, the remote proxy unit 20 in the first embodiment is operable to discard the remote request copy associated with the previously received Req1 packet. Preferably, the remote request queue in accordance with the first embodiment has the capacity to store one and only one remote request copy such that storing the Req2 remote request copy overwrites the Req1 remote request copy, thereby discarding such Req1 remote request copy.

Having produced the representative Req2 DisplayPort request, the remote proxy unit 20 is operable to output the representative Req2 DisplayPort request to the DisplayPort sink device 24 during the next occurring time slot.

Upon receiving a Rsp2 DisplayPort response from the DisplayPort sink device 24, the system 10 is operable to forward the Rsp2 DisplayPort response to the DisplayPort source 22 as described herein above.

Upon receiving a further new DisplayPort request from the DisplayPort source 22, indicated in FIG. 8 by the label "Req3", the system 10 is operable to forward this new DisplayPort request to the DisplayPort sink device 24 and to return a response therefrom to the DisplayPort source 22 in a manner described herein above. It is relevant to note that, in accordance with the first embodiment, the Req3 DisplayPort request would be treated by the system 10 as a new DisplayPort request even if in substance the contents of the Req3 DisplayPort request were identical to either of the Req1 DisplayPort request or the Req2 DisplayPort request shown in FIG. 8.

Figure 9:
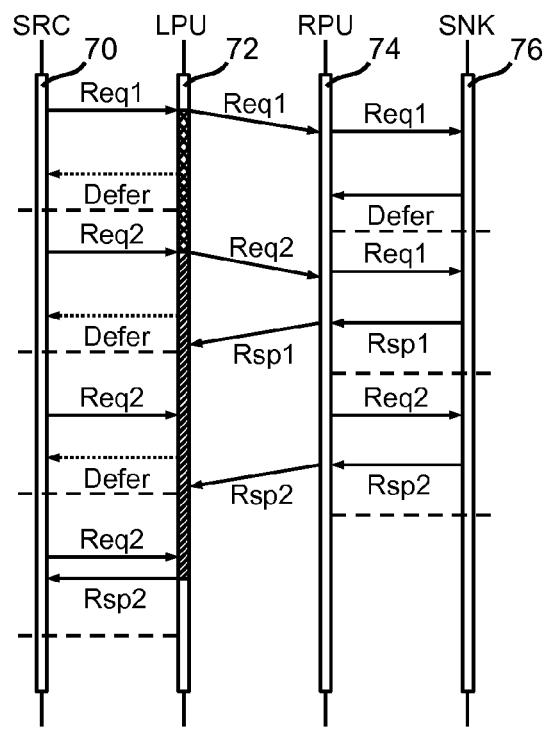
FIG. 9 is a sequence diagram of an exemplary sequence of a method of operation of the system shown in FIG. 1, showing an ignored response.

Referring to FIG. 9, a Req1 DisplayPort request received by the system 10 from the DisplayPort source 22 is forwarded to the DisplayPort sink device 24 and the local proxy unit 18 outputs a synthetic defer command pending its receipt of a Rsp1 packet, as described herein above. Thereafter in the exemplary sequence of FIG. 9, the DisplayPort source 22 issues a Req2 DisplayPort request, from which the local proxy unit 18 transmits a Req2 packet to the remote proxy unit 20. However, in the exemplary sequence of FIG. 9, the Req2 packet is received by the remote proxy unit 20 concurrently or after the remote proxy unit 20 has outputted to the DisplayPort sink device 24 a second attempt of the Req1 DisplayPort request. In the exemplary sequence of FIG. 9, the DisplayPort sink device 24 provides a Rsp1 DisplayPort response to the remote proxy unit 20, which in the first embodiment the remote proxy unit 20 is operable to transmit as a Rsp1 packet to the local unit.

In the first embodiment, when the remote proxy unit 20 has received both a Req1 packet and a Req2 packet, thereby invalidating the Req1 packet, then the remote proxy unit 20 will not continue outputting to the DisplayPort sink device 24 the representative Req1 DisplayPort request, but will at the next time slot of the remote proxy unit 20 output a representative Req2 DisplayPort request to the DisplayPort sink device 24.

In the first embodiment, when the local proxy unit 18 has transmitted to the remote proxy unit 20 both a Req1 packet and a Req2 packet, thereby invalidating the Req1 packet, then the first response the local proxy unit 18 receives (i.e. the Rsp1 packet) is ignored and the local proxy unit 18 awaits a subsequent second response. To do so, the local proxy unit 18 is operable to store at least an indication of the number of pending requests for which no response has been received, to increment the indication with each new request packet transmitted to the remote proxy unit 20 and decrement the indication with each new response packet received from the remote proxy unit 20. In a variation, the local proxy unit 18 is operable to store copies of each new request.

As shown in FIG. 9, a Rsp2 packet is subsequently received by the local proxy unit 18, with the result that the local proxy unit 18 outputs a corresponding Rsp2 DisplayPort response to the DisplayPort source 22 after the local proxy unit 18 receives the next attempt of the Req2 DisplayPort request.

In a variation of the first embodiment, the remote proxy unit 20, having received the Req2 packet from the local proxy unit 18 before having received the Rsp1 DisplayPort response from the DisplayPort sink device 24, is operable to ignore the received Rsp1 DisplayPort response and not transmit a corresponding Rsp1 packet to the local proxy unit 18. In such variation, the local proxy unit 18, upon receiving the first occurrence of a response packet (i.e. Rsp2 packet), associates that received response packet with the currently pending and valid request of the system 10, with the result that the local proxy unit 18 outputs a corresponding Req2 DisplayPort response to the DisplayPort source 22.

Second Embodiment

Figure 10:
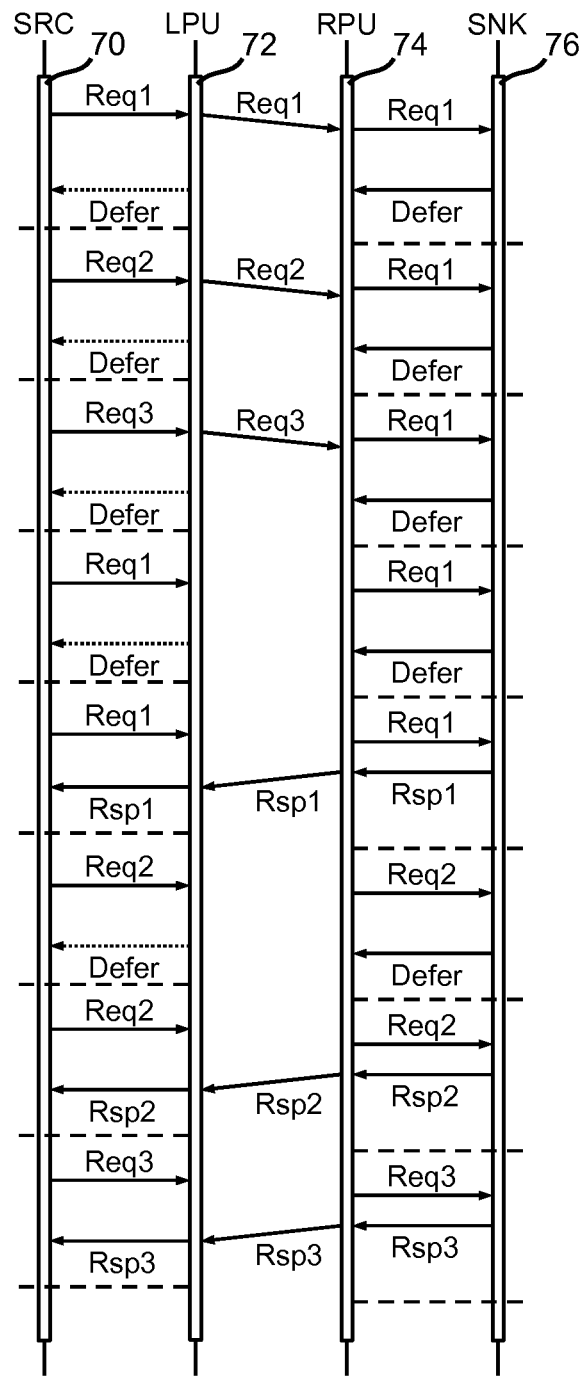
FIG. 10 is a sequence diagram of an exemplary sequence of a method of operation of the system shown in FIG. 1, showing operation in accordance with a second embodiment of the invention.
Figure 11:
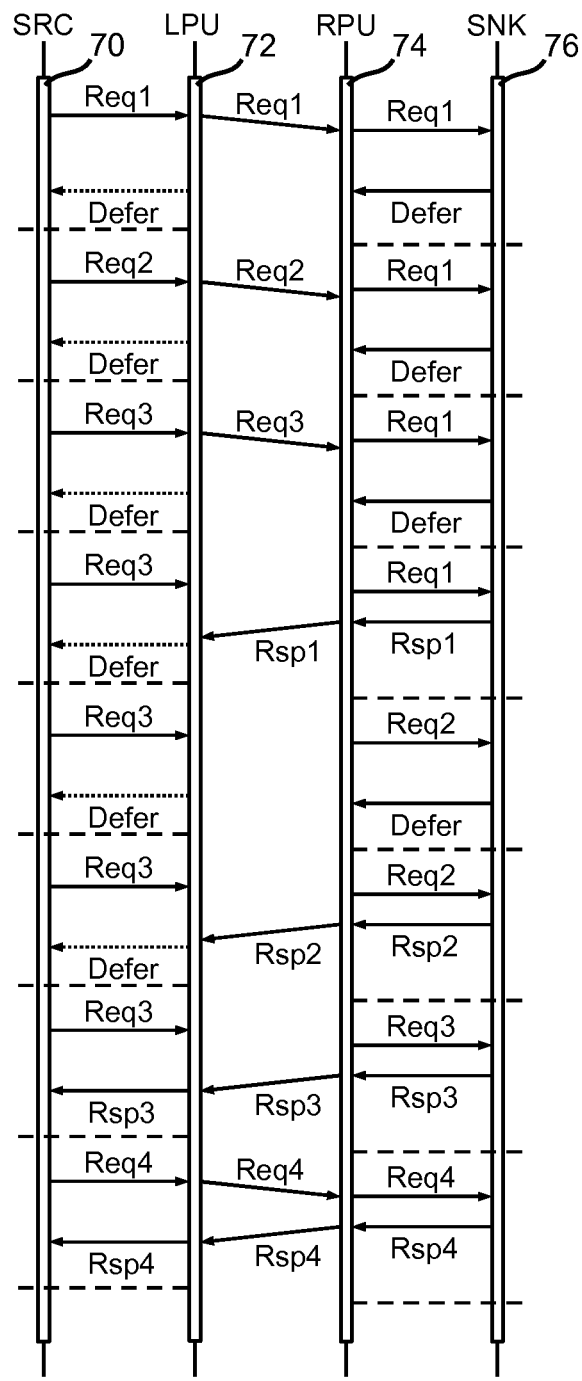
FIG. 11 is a sequence diagram of an exemplary sequence of a method of operation of the system shown in FIG. 1, showing further operation in accordance with the second embodiment of FIG. 10.

Referring to FIGS. 10 and 11, the system 10 is operable to manage multiple pending requests from the DisplayPort source 22 (FIG. 1) according to a second embodiment of the present invention.

FIG. 10 shows an exemplary sequence in which a Req1 DisplayPort request received by the system 10 from the DisplayPort source 22 is forwarded to the DisplayPort sink device 24 and the local proxy unit 18 outputs a synthetic defer command pending its receipt of a Rsp1 packet, as described herein above in respect of the first embodiment of the invention. As in the first embodiment, the local proxy unit 18 according to the second embodiment is operable to store in a local request queue of the local memory 44 a copy of at least one of the Req1 DisplayPort request and the Req1 packet, including storing an identifying portion thereof or related decoded contents thereof.

Thereafter in the exemplary sequence of FIG. 10, the DisplayPort source 22 issues a Req2 DisplayPort request, from which the local proxy unit 18 transmits a Req2 packet to the remote proxy unit 20. In the second embodiment, the local proxy unit 18 is operable to store in the local request queue of the local memory 44 a copy of at least one of the Req2 DisplayPort request and the Req2 packet without overwriting the stored copy associated with the Req1 request. To do so, the local request queue of the local memory 44 according to the second embodiment has a capacity size sufficient to store more than one copy. Moreover, the local proxy unit 18 according to the second embodiment stores in the local request queue indications of each of the Req1 DisplayPort request and the Req2 DisplayPort request in the order in which these DisplayPort requests were received by the local proxy unit 18.

Thereafter in the exemplary sequence of FIG. 10, the DisplayPort source 22 issues a Req3 DisplayPort request, from which the local proxy unit 18 transmits a Req3 packet to the remote proxy unit 20 and stores in the local request queue a copy of at least one of the Req3 DisplayPort request and the Req3 packet. In accordance with the second embodiment, the local request queue may have any desired capacity size greater than one.

As shown in FIG. 10, the remote proxy unit 20 continues to output at each new time slot the representative Req1 DisplayPort request until the remote proxy unit 20 receives from the DisplayPort sink device 24 a first response (i.e. Rsp1 DisplayPort response). Thereafter, the remote proxy unit 20 according to the second embodiment is operable to output a representative Req2 DisplayPort request.

To do so, the remote proxy unit 20 is operable to store in the remote request queue indications associated with each new request packet received by the remote proxy unit 20 in the order in which the remote proxy unit 20 received such requests. Such indications in some variations of embodiments are copies of at least one of a request packet and a representative DisplayPort request, or portions thereof or related decoded content, for example. According to the second embodiment, the remote request queue of the remote proxy unit 20 may have any desired capacity size greater than one.

In the exemplary sequence of FIG. 10, after the remote proxy unit 20 has received the Rsp2 DisplayPort response from the DisplayPort sink device 24, the remote proxy unit 20 is operable to retrieve from the remote request queue sufficient data to produce and output a representative Req3 DisplayPort request to the DisplayPort sink device 24.

Upon receiving the Rsp1 packet, the local proxy unit 18 is operable to produce in response thereto a representative Rsp1 DisplayPort response and to store in the local response queue of the local memory 44 a copy of at least one of Rsp1 packet and the representative Rsp1 DisplayPort response. According to the second embodiment, the local response queue is operable to have any desired capacity greater than one such that multiple copies associated with response packets can be stored in the order in which such response packets are received by the local proxy unit 18. In the exemplary sequence of FIG. 10, the local proxy unit 18 outputs a representative Rsp1 DisplayPort response after receiving a concurrent or subsequent Req1 DisplayPort request following the receipt by the local proxy unit 18 of the Req1 packet. Moreover, the local proxy unit 18 does so in respect of each of the three exemplary DisplayPort requests shown in FIG. 10.

Referring to FIG. 11, each of a Req1 DisplayPort request, Req2 DisplayPort request and a Req3 DisplayPort request received by the system 10 from the DisplayPort source 22 is forwarded to the DisplayPort sink device 24 and the local proxy unit 18 outputs synthetic defer commands pending its receipt of corresponding Response packets, as described herein above. Moreover, the local proxy unit 18 is operable to store local request copies as described herein above.

The remote proxy unit 20 is operable in the second embodiment to output representative DisplayPort requests in the order in which the corresponding request packets were received, with each new representative DisplayPort request being outputted until the remote proxy unit 20 receives a response from the DisplayPort sink device 24.

In the exemplary sequence of FIG. 11, the DisplayPort source 22 issues Req3 DisplayPort requests to the local proxy unit 18 until the local proxy unit 18 outputs to the DisplayPort source 22 a representative Rsp3 DisplayPort response. In the second embodiment, doing so invalidates all previously received and stored requests. Thus, the local proxy unit 18 in the second embodiment is operable, upon receiving the Req3 packet following receiving from the DisplayPort source 22 a subsequent attempt of the Req3 DisplayPort request, to invalidate all earlier requests received by the local proxy unit 18 by discarding from the local request queue and the local response queue all indications relating to the current request (i.e. Req3) and all previously received requests and associated responses (e.g. Req1 and Req2).

In the exemplary sequence of FIG. 11 after the local proxy unit 18 has outputted the representative Req3 DisplayPort request to the DisplayPort source 22, a new Req4 DisplayPort request is forwarded by the system 10 to the DisplayPort sink device 24 and a response therefrom is forwarded to the DisplayPort source 22. It is relevant to note that, in accordance with the first embodiment, the Req4 DisplayPort request would be treated by the system 10 as a new DisplayPort request even if in substance the contents of the Req4 DisplayPort request were identical to any one of the Req1 DisplayPort request, the Req2 DisplayPort request, or the Req3 DisplayPort request shown in FIG. 11.

Non-DisplayPort Information

Referring to FIG. 12, the proxy features of the system 10 advantageously permits the system 10 to communicate non-DisplayPort (non-DP) communications along the communications link 12. By way of example, the bandwidth allocated under at least one revision of the DisplayPort specification for auxiliary channel data is 1 Mbps; however, the local proxy unit 18, the communications link 12 and the remote proxy unit 20 are operable in at least some embodiments of the present invention to communicate in accordance with a bandwidth greater than 1 Mbps. The combined bandwidth of the local link medium channel 46, the communications link 12 and the remote link medium channel 52 in some embodiments of the present invention is 720 Mbps or higher. Thus, the system 10 advantageously permits the communication of both DisplayPort information and non-DP information along a common communications link, such as the communications link 12 shown in FIG. 12.

Non-DP information may be any information in a form compliant with any protocol, including USB (Universal Serial Bus) or other serial protocols, IEEE 1284 or other parallel port protocols, ethernet, PCI (Peripheral Component Interconnect), MIDI (Musical Instrument Digital Interface), other standard communications protocols, custom communications protocols, or any combination thereof for example.

As shown in FIG. 12, the local proxy unit 18 is operable to connect to a non-DP source 78 having a non-DP source connector 80 for receiving a non-DP local cable 82. The non-DP source 78 can be any system capable of electronic communications, including any general purpose computer, any other type of computer or portion thereof, distributed network for computing, modem, portable communications device, facsimile machine, telephone, including a land-line-connected or a wireless telephone such as a cellular or satellite telephone, radio, including a two-way radio, personal digital assistant, visual information processor, audio information processor, telecommunications equipment or device, database controller, equipment controller, data processing equipment, discrete hardware components, any other functional device or equipment suitable for effecting electronic communications and any combination thereof, for example.

The non-DP cable is shown in FIG. 12 being received by the non-DP local interface 84 of the local proxy unit 18. The non-DP local interface 84 in some embodiments includes a physical connector. Additionally or alternatively, the non-DP local interface 84 includes in some embodiments information processing functionality for initial processing of signals received into the non-DP local interface 84 from the non-DP local cable 82 and for final processing of signals being delivered from the non-DP local interface 84 to the non-DP local cable 82. While FIG. 12 shows the local DisplayPort interface 30 and the non-DP local interface 84 as separate functional blocks, the functionality, including possibly the physical connectivity, of the local DisplayPort interface 30 and the non-DP local interface 84 may be provided by the same features of the local proxy unit 18.

A non-DP local channel 86 of the local proxy unit 18 is operable to transfer non-DP information between the non-DP local interface 84 and the local controller 40. Also, a non-DP remote channel 88 of the remote proxy unit 20 is connected between the remote controller 56 and a non-DP remote interface 90 of the remote proxy unit 20. The non-DP remote interface 90 may be identical, similar or analogous to or different from the non-DP local interface 84. Preferably, the non-DP remote interface 90 is operable to receive a non-DP destination cable 92 connected between the remote proxy unit 20 and the non-DP destination connector 94 of a non-DP destination device 96.

Communications between the non-DP source 78 and the non-DP destination 96 need not be limited to one-way communications from the non-DP source 78 to the non-DP destination 96. In some embodiments, the system 10 is operable to communicate non-DP communications via the communications link 12 uni-directionally, uni-directionally in either direction, or bi-directionally.

In the case of bi-directional communications, the local controller 40 is operable to receive non-DP information from the non-DP local channel 86; produce one or more non-DP packets in response to the received non-DP information; buffer non-DP packets prior to transmitting buffered non-DP packets; transmit non-DP packets to the remote proxy unit 20 via the communications link 12, including transmitting non-DP packets by interleaving non-DP packets and DisplayPort packets; receive non-DP packets from the local link medium channel 46; produce in response to a received non-DP packet representative non-DP information representing non-DP information received by the remote proxy unit 20 from the non-DP destination device 96; and output representative non-PD information to the non-DP local channel 86 for delivery to the non-DP source 78.

Similarly, the remote controller 56 is operable to receive non-DP information from the non-DP remote channel 88; produce one or more non-DP packets in response to the received non-DP information; buffer non-DP packets prior to transmitting buffered non-DP packets; transmit non-DP packets to the local proxy unit 18 via the communications link 12, including transmitting non-DP packets by interleaving non-DP packets and DisplayPort packets; receive non-DP packets from the remote link medium channel 52; produce in response to a received non-DP packet representative non-DP information representing non-DP information received by the local proxy unit 18 from the non-DP source 78; and output representative non-PD information to the non-DP remote channel 88 for delivery to the non-DP destination device 96.

Preferably, the non-DP packets produced by the local controller 40 and the remote controller 56 are produced for compatibility with the given communications link 12 connected to or forming part of the system 10.

Buffering non-DP packets by the local controller 40 may involve storing such non-DP packets in the local memory 44, such as in a buffer queue of the local memory 44. Similarly, buffering non-DP packets by the remote controller 56 may involve storing such non-DP packets in the remote memory 60, such as in a buffer queue of the remote memory 60.

Although shown in FIG. 12 as functionally different channels, any one or more of the local main link channel 32, the local HPD channel 34, the local AUX channel 36, the local link medium channel 46 and the non-DP local channel 86 may form part of a single physical bus within the local proxy unit 18. Similarly, any one or more of the remote main link channel 50, the remote HPD channel 62, the remote AUX channel 64, the remote link medium channel 52 and the non-DP remote channel 88 may form part of a single physical bus within the remote proxy unit 20.

Although the source DisplayPort cable 28 and the non-DP local cable 82 are shown in FIG. 12 as physically separate cables, a single cable may be used in accordance with variations of embodiments, such as where any one or more of the local DisplayPort interface 30 and the non-DP local interface 84 are integrated. Similarly, a single cable may be used in place of the sink DisplayPort cable 66 and the non-DP destination cable 92, such as where the remote DisplayPort interface 54 and the non-DP remote interface 90 are integrated.

Although shown in FIG. 12 as functionally different devices, any one or more of the local proxy unit 18, the DisplayPort source 22 and the non-DP source 78 may be integrated together within a single device. Similarly, any one or more of the remote proxy unit 20, the DisplayPort sink device 24 and the non-DP destination device 96 may be integrated together within a single device. By way of example, the non-DP destination device 96 may be a communications hub, such as a USB hub, for distributing USB signals to various devices (not shown), and such USB hub may be integrated within the remote proxy unit 20. By way of further example, the DisplayPort source 22 and the non-DP source 78 may be a single device, and the DisplayPort sink device 24 and the non-DP destination device 96 may be a single device.

The system 10 of FIG. 12 is operable to communicate DisplayPort information in the manner described herein above in respect of the first embodiment, the second embodiment, either or both of the first and second embodiments, or variations thereof for example.

Caching Feature

With reference to FIGS. 1 to 12, in some embodiments and variations thereof the system 10 is operable to obtain and store DisplayPort information from the DisplayPort sink device 24 in the absence of receiving a DisplayPort request for such DisplayPort information. By way of example, the remote proxy unit 20 in such embodiments and variations thereof is operable to output a representative DisplayPort request for delivery to the DisplayPort sink device 24. Such representative DisplayPort request may be a request for information related to the DisplayPort sink device 24 that is generally considered to be static or otherwise non-changing in time (e.g. identification information, display parameters such as screen resolution, manufacturer identification, color depth parameter, refresh rate, etc.), including information determined to be commonly requested, or otherwise statistically likely to be requested, by a given DisplayPort source 22. Upon receiving a DisplayPort response from the DisplayPort sink device 24, the remote proxy unit 20 is operable to produce a response packet therefrom and communicate such response packet to the local proxy unit 18 via the communications link 12. At least one of the local proxy unit 18 and the remote proxy unit 20 is operable to store, such as by caching, indications of the requested information. In such manner, the system 10 is operable to provide to the local proxy unit 18 a cached DisplayPort response following the issuance from the local proxy unit 18 of a DisplayPort request for such static information. Caching such static information advantageously permits the system 10 to provide to the DisplayPort source 22 timely responses while permitting distances between the DisplayPort source 22 and the DisplayPort sink device 24 greater than would otherwise be possible under the DisplayPort specification, including advantageously permitting communication between the DisplayPort source 22 and the DisplayPort sink device 24 via one or more of a variety of different types of communications links 12.

With reference to FIGS. 1 to 12, the system 10 in accordance with any embodiment described and/or illustrated herein involving use of the communications link 12 advantageously reduces the amount of auxiliary channel buffering that is required as a result of the dual simplex nature of the communications link 12. By way of explanation and as shown in the Figures, the system 10 is operable to simultaneously transmit communications along the communications link 12 in opposing directions. Therefore, the system 10 need not wait for transmissions in a given direction to be completed before initiating a transmission in the opposite direction, as ordinarily is the case with simplex communications in accordance with the DisplayPort specification.

Thus, there is provided a method of communicating DisplayPort information, the method comprising: transmitting by a local unit to a remote unit via a first simplex channel of a dual simplex communications link a request packet produced by the local unit in response to a DisplayPort request received by the local unit from a DisplayPort source unit; and transmitting by the remote unit to the local unit via a second simplex channel of the dual simplex communications link a reply packet produced by the remote unit in response to a DisplayPort reply received by the remote unit from a DisplayPort sink unit.

While embodiments of the invention have been described and illustrated, such embodiments should be considered illustrative of the invention only. The invention may include variants not described or illustrated herein in detail. For example, the local proxy unit 18 may be implemented to include functionality of the remote proxy unit 20 and vice versa such that the local proxy unit 18 and the remote proxy unit 20 become interchangeable within the system 10. Thus, the embodiments described and illustrated herein should not be considered to limit the invention as construed in accordance with the accompanying claims.

What is claimed is:

1. A method of communicating DisplayPort information, the method comprising:
    (a) transmitting by a local unit to a remote unit via a first simplex channel of a dual simplex communications link a request packet produced by said local unit in response to a DisplayPort request received by said local unit from a DisplayPort source unit;
    (b) transmitting by said remote unit to said local unit via a second simplex channel of said dual simplex communications link a reply packet produced by said remote unit in response to a DisplayPort reply received by said remote unit from a DisplayPort sink unit;
    (c) outputting to said DisplayPort source unit a synthetic defer command produced by said local unit;
    (d) storing in a request queue of a memory of said local unit a stored request comprising at least one of said DisplayPort request and said request packet;
    (e) storing in a reply queue of said memory a stored reply comprising at least one of said DisplayPort reply and said reply packet; and
    (f) outputting by said remote unit to said DisplayPort sink unit a representative DisplayPort request produced by said remote unit in response to said request packet so as to be representative of said DisplayPort request.

2. The method of claim 1 further comprising upon receiving by said local unit a subsequent DisplayPort request matching said stored request, performing by said local unit an operation selected from the group consisting of:
    (i) outputting to said DisplayPort source unit a representative DisplayPort reply produced by said local unit in response to said reply packet so as to represent said DisplayPort request;
    (ii) outputting to said DisplayPort source unit a synthetic defer command produced by said local unit; and
    (iii) preventing output to said DisplayPort source unit so as to create a timeout.

3. The method of claim 2 wherein outputting to said DisplayPort source unit a representative DisplayPort reply produced by said local unit in response to said reply packet so as to represent said DisplayPort request comprises determining a request queue position within said request queue of said stored request, determining a reply queue position within said reply queue of said stored reply, and outputting said representative DisplayPort reply if said request queue position matches said reply queue position.

4. The method of claim 2 wherein outputting to said DisplayPort source unit a synthetic defer command produced by said local unit comprises determining a request queue position within said request queue of said stored request, and outputting said synthetic defer command if said request queue position does not match a reply queue position associated with said reply queue.

5. The method of claim 2 wherein preventing output to said DisplayPort source unit so as to create a timeout comprises determining a request queue position within said request queue of said stored request, determining a reply queue position within said reply queue of said stored reply, and preventing said output if said request queue position matches said reply queue position and said stored reply comprises a timeout command.

6. The method of claim 2 further comprising, upon performing said operation when a request queue position of said stored request matches a reply queue position of said stored reply, discarding said stored request and any previously stored request and discarding said stored reply and any previously stored reply.

7. The method of claim 1 wherein storing in a request queue of a memory of said local unit a stored request comprising at least one of said DisplayPort request and said request packet comprises storing said stored request in said request queue having a capacity size of one.

8. The method of claim 1 wherein outputting by said remote unit to said DisplayPort sink unit a representative DisplayPort request produced by said remote unit in response to said request packet so as to be representative of said DisplayPort request comprises storing in a remote queue of a remote memory of said remote unit a remotely stored request comprising at least one of said request packet and said representative DisplayPort request.

9. The method of claim 8 wherein transmitting by said remote unit to said local unit via a second simplex channel of said dual simplex communications link a reply packet produced by said remote unit in response to a DisplayPort reply received by said remote unit from a DisplayPort sink unit comprises discarding said remotely stored request.

10. The method of claim 9 further comprising outputting by said remote unit to said DisplayPort sink unit a further representative DisplayPort request associated with a next earliest remotely stored request.

11. The method of claim 1 wherein outputting by said remote unit to said DisplayPort sink unit a representative DisplayPort request produced by said remote unit in response to said request packet so as to be representative of said DisplayPort request comprises outputting said representative DisplayPort request in response to receiving by said remote unit from said DisplayPort sink unit a sink defer command.

12. The method of claim 1 wherein transmitting by said remote unit to said local unit via a second simplex channel of said dual simplex communications link a reply packet produced by said remote unit in response to a DisplayPort reply received by said remote unit from a DisplayPort sink unit comprises transmitting said reply packet comprising a timeout command if no response from said DisplayPort sink unit is received by said remote unit within a time window following the outputting of said representative DisplayPort request.

13. The method of claim 1 further comprising transmitting by said local unit to said remote unit via said first simplex channel non-DP data produced by said local unit in response to non-DP information received by said local unit from a non-DP source device.

14. The method of claim 1 further comprising transmitting by said remote unit to said local unit via said second simplex channel non-DP data produced by said remote unit in response to non-DP information received by said remote unit from a non-DP destination device.

15. A system for communicating DisplayPort information, the system comprising:
(a) a local unit comprising a local controller operable to produce a request packet in response to a DisplayPort request received by said local unit from a DisplayPort source unit and to transmit said request packet to a remote unit of the system via a first simplex channel of a dual simplex communications link; and
(b) said remote unit comprising a remote controller operable to produce a reply packet in response to a DisplayPort reply received by said remote unit from a DisplayPort sink unit and to transmit said reply packet to said local unit via a second simplex channel of said dual simplex communications link, wherein:
(i) said local controller is operable to operate a request queue of a memory of said local unit and to operate a reply queue of said memory, and wherein said remote controller is operable to operate a remote queue of a remote memory of said remote unit; and
(ii) said local controller is operable to select and then output from said local unit an output selected from the group consisting of a representative DisplayPort reply, a synthetic defer command and a timeout, and wherein said remote controller is operable to output from said remote unit a representative DisplayPort request.

16. The system of claim 15 wherein said local controller is operable to produce non-DP downstream data in response to non-DP source information received by said local unit from a non-DP source device and to transmit said non-DP downstream data to said remote unit via said first simplex channel, and wherein said remote controller is operable to produce non-DP upstream data in response to non-DP destination information received by said remote unit from a non-DP destination device and to transmit said non-DP upstream data to said local unit via said second simplex channel.

17. A system for communicating DisplayPort information, the system comprising:
(a) local means for producing a request packet in response to a DisplayPort request received by a local unit of the system from a DisplayPort source unit and transmitting said request packet to a remote unit of the system via a first simplex channel of a dual simplex communications link; and
(b) remote means for producing a reply packet in response to a DisplayPort reply received by said remote unit from a DisplayPort sink unit and transmitting said reply packet to said local unit via a second simplex channel of said dual simplex communications link, and wherein:
(i) said local means comprises request queueing means for operating a request queue of a memory of said local unit and reply queueing means for operating a reply queue of said memory, and wherein said remote means comprises remote queueing means for operating a remote queue of a remote memory of said remote unit; and
(ii) said local means comprises local outputting means for selecting and then outputting by said local unit an output selected from the group consisting of a representative DisplayPort reply, a synthetic defer command and a timeout, and wherein said remote means comprises remote outputting means for outputting by said remote unit a representative DisplayPort request.

18. The system of claim 17 wherein said local means comprises non-DP local transmitting means for producing non-DP downstream data in response to non-DP source information received by said local unit from a non-DP source device and transmitting said non-DP downstream data to said remote unit via said first simplex channel, and wherein said remote means comprises non-DP remote transmitting means for producing non-DP upstream data in response to non-DP destination information received by said remote unit from a non-DP destination device and transmitting said non-DP upstream data to said local unit via said second simplex channel.

19. A computer program product comprising computer-executable instructions embodied in a non-transitory computer-readable medium for controlling one or more processors of a local unit connected to a remote unit via a dual simplex communications link, the dual simplex communications link having first and second simplex channels, to carry out the following steps:
(a) receiving a DisplayPort request from a DisplayPort source unit and outputting to said DisplayPort source unit a synthetic defer command produced by said local unit;
(b) producing a request packet in response to said DisplayPort request;
(c) storing in a request queue of a memory of the local unit a stored request comprising at least one of said DisplayPort request and said request packet;
(d) transmitting said request packet to the remote unit via the first simplex channel;
(e) receiving a reply packet from the remote unit via the second simplex channel;
(f) associating said reply packet with said stored request;
(g) producing a DisplayPort reply in response to said reply packet and outputting to said DisplayPort source unit said DisplayPort reply upon receiving a subsequent DisplayPort request corresponding to said stored request;
(h) receiving non-DP information from a non-DP source;
(i) producing non-DP data in response to said non-DP information; and
(j) transmitting said non-DP data to the remote unit via the first simplex channel.

20. The computer program product of claim 19 comprising further computer-executable instructions for:
- (k) receiving upstream data from the remote unit via the second simplex channel;
- (l) producing upstream information in response to said upstream data; and
- (m) outputting said upstream information to said non-DP source.

21. A computer program product comprising computer-executable instructions embodied in a non-transitory computer-readable medium for controlling one or more processors of a remote unit connected to a local unit via a dual simplex communications link, the dual simplex communications link having first and second simplex channels, to carry out the following steps:
- (a) receiving a DisplayPort packet from said local unit via the first simplex channel;
- (b) producing a DisplayPort request in response to said DisplayPort packet;
- (c) outputting said DisplayPort request to a DisplayPort sink unit upon resolution of preceding DisplayPort requests;
- (d) subsequently outputting said DisplayPort request in response to receiving a sink defer command from said DisplayPort sink unit;
- (e) receiving a DisplayPort reply from said DisplayPort sink unit;
- (f) producing a reply packet in response to said DisplayPort reply;
- (g) transmitting said reply packet to the local unit via the second simplex channel;
- (h) receiving non-DP data from the local unit via the first simplex channel;
- (i) producing non-DP information in response to said non-DP data; and
- (j) outputting said non-DP information to a non-DP destination device.

22. The computer program product of claim 21 comprising further computer-executable instructions for:
- (k) receiving upstream information from said non-DP destination device;
- (l) producing upstream data in response to said upstream information; and
- (m) transmitting said upstream data to the local unit via the second simplex channel.

* * * * *